US012277840B2

(12) United States Patent
Bouvier et al.
(10) Patent No.: US 12,277,840 B2
(45) Date of Patent: Apr. 15, 2025

(54) GAMING MACHINE AND METHOD WITH PERSISTENCE FEATURE

(71) Applicant: LNW Gaming, Inc., Las Vegas, NV (US)

(72) Inventors: George Bouvier, Henderson, NV (US); Richard Milosevich, Las Vegas, NV (US); Kenneth Shawn Soong, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 255 days.

(21) Appl. No.: 17/895,222

(22) Filed: Aug. 25, 2022

(65) Prior Publication Data

US 2023/0154287 A1 May 18, 2023

Related U.S. Application Data

(60) Provisional application No. 63/279,501, filed on Nov. 15, 2021.

(51) Int. Cl.
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/34* (2013.01)

(58) Field of Classification Search
CPC .. G07F 17/3267; G07F 17/3211; G07F 17/34; G07F 17/3213
See application file for complete search history.

(56) References Cited

U.S. PATENT DOCUMENTS

| | | | |
|---|---|---|---|
| 3,733,075 | A | 5/1973 | Hooker et al. |
| 4,198,052 | A | 4/1980 | Gauselmann |
| 4,732,386 | A | 3/1988 | Rayfiel |
| 5,100,137 | A | 3/1992 | Fulton |
| 5,152,529 | A | 10/1992 | Okada |

(Continued)

FOREIGN PATENT DOCUMENTS

| | | | |
|---|---|---|---|
| AU | 2013251288 | A1 | 5/2014 |
| AU | 2014202042 | A1 | 5/2014 |

(Continued)

OTHER PUBLICATIONS

Ancient Arcadia game brochure, Copyright 2011 IGT.

(Continued)

*Primary Examiner* — Steve Rowland

(57) ABSTRACT

A gaming machine includes a display device and game-logic circuitry that causes the display device to: present cycle outcomes by populating a symbol array with randomly selected symbols; lock any trigger symbols from the randomly selected symbols in the symbol array; present a subset counter for an array subset with locked trigger symbols; in response to a modifier event associated with a first trigger symbol locked within the subset, present a first award value associated with the first trigger symbol; in response to a number of trigger symbols within the subset meeting a trigger amount, provide an award at least partially as a function of the first award value; and in response to the subset counter meeting a termination count, remove any locked trigger symbols from the subset.

21 Claims, 16 Drawing Sheets

(56) References Cited

U.S. PATENT DOCUMENTS

| | | | |
|---|---|---|---|
| 5,205,555 | A | 4/1993 | Hamano |
| 5,342,047 | A | 8/1994 | Heidel et al. |
| 5,356,140 | A | 10/1994 | Dabrowski et al. |
| 5,393,061 | A | 2/1995 | Manship et al. |
| 5,395,111 | A | 3/1995 | Inoue |
| 5,431,408 | A | 7/1995 | Adams |
| 5,511,781 | A | 4/1996 | Wood et al. |
| 5,618,232 | A | 4/1997 | Martin |
| 5,695,188 | A | 12/1997 | Ishibashi |
| 5,704,835 | A | 1/1998 | Dietz |
| 5,722,891 | A | 3/1998 | Inoue |
| 5,752,881 | A | 5/1998 | Inoue |
| 5,766,074 | A | 6/1998 | Cannon et al. |
| 5,788,573 | A | 8/1998 | Baerlocher et al. |
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes, Jr. et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson, Jr. et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano, Jr. et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,869,360 | B2 | 3/2005 | Marks et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,926,609 | B2 | 8/2005 | Martin |
| 6,960,134 | B2 | 11/2005 | Hartl et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,121,945 | B2 | 10/2006 | Suganuma et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,980,936 | B2 | 7/2011 | Mead |
| 8,021,223 | B2 | 9/2011 | Rose |
| 8,021,225 | B2 | 9/2011 | Okada |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,121 | B2 | 8/2013 | Macvittie et al. |
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,790,169 | B2 | 7/2014 | Saunders |

(56) References Cited

U.S. PATENT DOCUMENTS 8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
10,013,855 B2 7/2018 Nakamura
10,037,651 B2 7/2018 You et al.
10,043,350 B2 8/2018 Gomez et al.
10,062,237 B2 8/2018 Devine et al.
10,204,473 B2 2/2019 Lenger
10,242,533 B2 3/2019 Okada et al.
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,672,220 B2 6/2020 Lenger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0021666 A1 9/2001 Yoshida et al.
2002/0016200 A1 2/2002 Baerlocher et al.
2002/0045474 A1 4/2002 Singer et al.
2002/0107058 A1* 8/2002 Namba .................. A63F 13/12
463/3
2002/0119818 A1 8/2002 Savio et al.
2002/0155881 A1 10/2002 Yoshida
2002/0183105 A1 12/2002 Cannon et al.
2002/0187827 A1* 12/2002 Blankstein .......... G07F 17/3244
463/20
2002/0198042 A1* 12/2002 Webb .................. G07F 17/3244
463/20
2003/0008705 A1* 1/2003 Baerlocher ............. G07F 17/34
463/20
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0043815 A1 3/2004 Kaminkow
2004/0048646 A1 3/2004 Visocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2006/0281528 A1* 12/2006 Hall ........................ G07F 17/32
463/20
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0182647 A1 7/2008 Brunet De Courssou et al.
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0239634 A1 9/2009 Nguyen
2009/0291741 A1 11/2009 Schofield
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0244943 A1 10/2011 Milford et al.
2011/0300937 A1 12/2011 Crowder, Jr. et al.
2012/0015707 A1 1/2012 Hornik et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0220360 A1 8/2012 Mcallister et al.
2013/0065663 A1 3/2013 Johnson et al.
2013/0102375 A1 4/2013 Aoki et al.
2013/0260861 A1 10/2013 Vann et al.
2014/0014186 A1 1/2014 Bhattacharya et al.
2014/0024429 A1 1/2014 Aoki et al.
2014/0051496 A1 2/2014 Meyer
2014/0141860 A1 5/2014 Meyer
2014/0179396 A1 6/2014 Aoki et al.
2014/0274292 A1 9/2014 Suda
2014/0323198 A1 10/2014 Tuck
2015/0031437 A1 1/2015 Gomez et al.
2015/0170462 A1 6/2015 Berman et al.
2015/0206386 A1 7/2015 Jaffe et al.
2015/0269809 A1 9/2015 Smith
2015/0287269 A1 10/2015 Berman
2015/0356833 A1 12/2015 Aoki et al.
2015/0379831 A1 12/2015 Lee et al.
2016/0042597 A1 2/2016 Olive
2016/0155303 A1 6/2016 Aoki et al.
2017/0154498 A1 6/2017 Olive
2017/0372558 A1* 12/2017 You ..................... G07F 17/3267
2018/0061176 A1* 3/2018 Berman .............. G07F 17/3213
2018/0130303 A1 5/2018 Lamb
2018/0268655 A1 9/2018 Olive
2018/0268659 A1 9/2018 Chesworth et al.
2019/0102992 A1 4/2019 You et al.
2019/0236905 A1 8/2019 Washington et al.
2021/0366226 A1 11/2021 Cohn et al.

(56) References Cited

U.S. PATENT DOCUMENTS

| | | | | |
|---|---|---|---|---|
| 2021/0366227 | A1 | 11/2021 | Milosevich | |
| 2021/0366237 | A1 | 11/2021 | Bouvier et al. | |
| 2024/0024751 | A1* | 1/2024 | Azaria ............... | A63B 21/0059 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Playboy Cash Wheel, SG Gaming Inc, retrieved from: https://www.sggaming.com/Games/SCIENTIFIC-GAMES/class3/premium-Games/playboy-cash-wheel-18515, 3 pages.

* cited by examiner

GAMING MACHINE AND METHOD WITH PERSISTENCE FEATURE

CROSS-REFERENCE TO RELATED APPLICATIONS

This application claims the benefit of priority to U.S. Provisional Patent Application No. 63/279,501, filed Nov. 15, 2021, the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, apparatus, and methods and, more particularly, to new and improved animations in connection with a symbol array persistence feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to one aspect of the present invention, there is provided a gaming machine comprises a display device and game-logic circuitry in communication with the display device. The display device presents a symbol array including a plurality of symbol positions. The game-logic circuitry causes the display device to: (i) present a first cycle outcome by populating the symbol array with a plurality of randomly selected symbols, (ii) in response to the first cycle outcome including at least one trigger symbol, lock the at least one trigger symbol in the symbol array, (iii) present a subset counter associated with the subset to an initial count in response to the first cycle outcome, (iv) with the at least one trigger symbol locked in the subset, present at least one subsequent cycle outcome by populating the symbol array with another plurality of randomly selected symbols for each of the at least one subsequent cycle outcome, (v) in response to the at least one subsequent cycle outcome including any additional trigger symbols in the subset, lock the additional trigger symbols in the subset, (vi) in response to a modifier event associated with a first trigger symbol locked within the subset, present a first award value associated with the first trigger symbol, (vii) in response to a number of trigger symbols within the subset meeting a trigger amount, provide an award at least partially as a function of the first award value and respective award values associated with other trigger symbols in the subset, and (viii) in response to the subset counter meeting a termination count, remove any locked trigger symbols from the subset.

In another aspect of the present invention, a method for conducting a game using a gaming system is provided. The gaming system includes a gaming machine and game-logic circuitry, where the game-logic circuitry may be included within the gaming machine. The gaming machine includes a display device configured to present a symbol array including a plurality of symbol positions. The method comprises the game-logic circuitry causing the display device to: (i) present a first cycle outcome by populating the symbol array with a plurality of randomly selected symbols, (ii) in response to the first cycle outcome including at least one trigger symbol, lock the at least one trigger symbol in the symbol array, (iii) present a subset counter associated with the subset to an initial count in response to the first cycle outcome, (iv) with the at least one trigger symbol locked in the subset, present at least one subsequent cycle outcome by populating the symbol array with another plurality of randomly selected symbols for each of the at least one subsequent cycle outcome, (v) in response to the at least one subsequent cycle outcome including any additional trigger symbols in the subset, lock the additional trigger symbols in the subset, (vi) in response to a modifier event associated with a first trigger symbol locked within the subset, present a first award value associated with the first trigger symbol, (vii) in response to a number of trigger symbols within the subset meeting a trigger amount, provide an award at least partially as a function of the first award value and respective award values associated with other trigger symbols in the subset, and (viii) in response to the subset counter meeting a termination count, remove any locked trigger symbols from the subset.

In a further aspect of the present invention, a gaming system comprises a gaming machine and game-logic circuitry, where the game-logic circuitry may be included within the gaming machine. The gaming machine includes a display device configured to present a symbol array including a plurality of symbol positions. The method comprises the game-logic circuitry causing the display device to: (i) present a first cycle outcome by populating the symbol array with a plurality of randomly selected symbols, (ii) in response to the first cycle outcome including at least one trigger symbol, lock the at least one trigger symbol in the symbol array, (iii) present a subset counter associated with the subset to an initial count in response to the first cycle outcome, (iv) with the at least one trigger symbol locked in the subset, present at least one subsequent cycle outcome by populating the symbol array with another plurality of randomly selected symbols for each of the at least one subsequent cycle outcome, (v) in response to the at least one subsequent cycle outcome including any additional trigger symbols in the subset, lock the additional trigger symbols in the subset, (vi) in response to a modifier event associated with a first trigger symbol locked within the subset, present a first award value associated with the first trigger symbol, (vii) in response to a number of trigger symbols within the subset meeting a trigger amount, provide an award at least partially as a function of the first award value and respective award values associated with other trigger symbols in the subset, and (viii) in response to the subset counter meeting a termination count, remove any locked trigger symbols from the subset.

Additional aspects of the invention will be apparent to those of ordinary skill in the art in view of the detailed description of various embodiments, which is made with reference to the drawings, a brief description of which is provided below.

Figure 1:
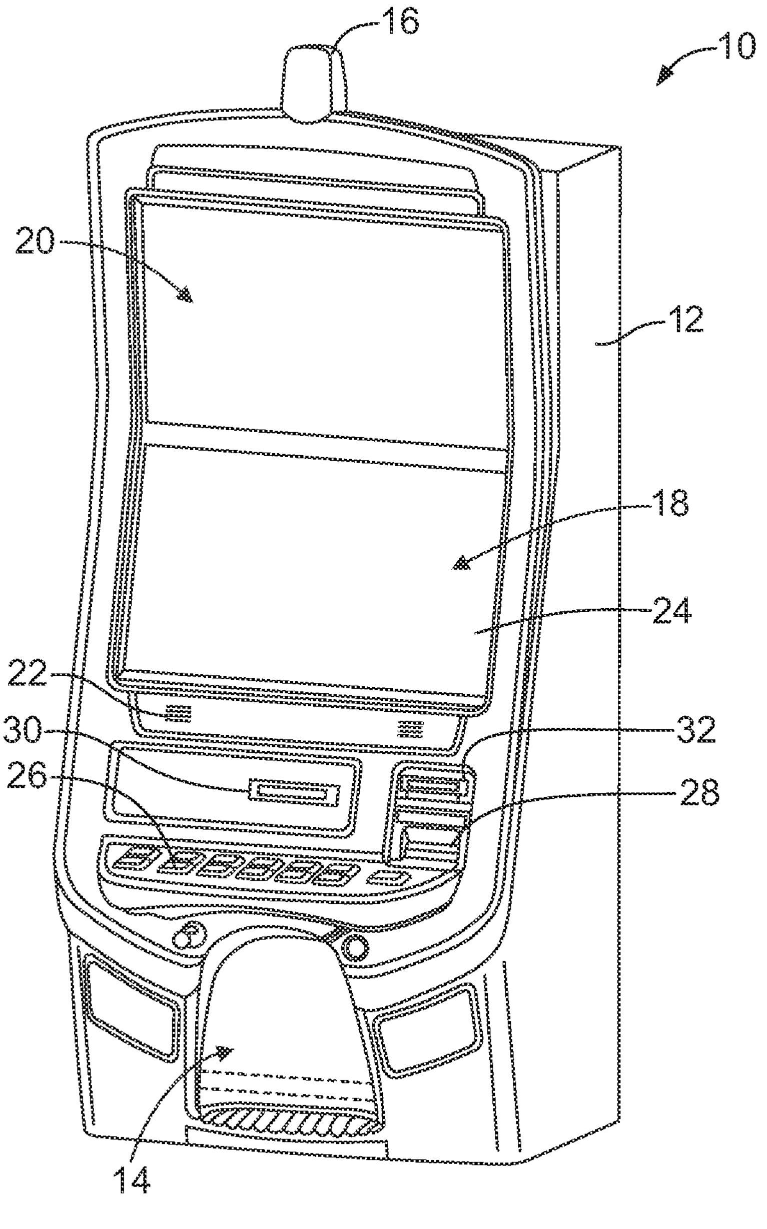
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. Embodiments may be combined with aspects of one embodiment supplementing or replacing aspects of another embodiment. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present invention comprise an innovative application of data processing steps that, when implemented by game-logic circuitry, direct an electronic display device to present a symbol-value aggregation process that minimizes processing overhead by utilizing numbered indicia to represent credit values instead of complex, fanciful game images. Further, the process aggregates displayed values borne by special symbols (i.e., value-bearing symbols) according to stored, variable criteria. In this way, the value-bearing symbols provide building blocks for innumerable different aggregation sequences simply by manipulating the aggregation criteria associated with the value-bearing symbols, resulting in fewer rules needed for the aggregation process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-aggregation process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
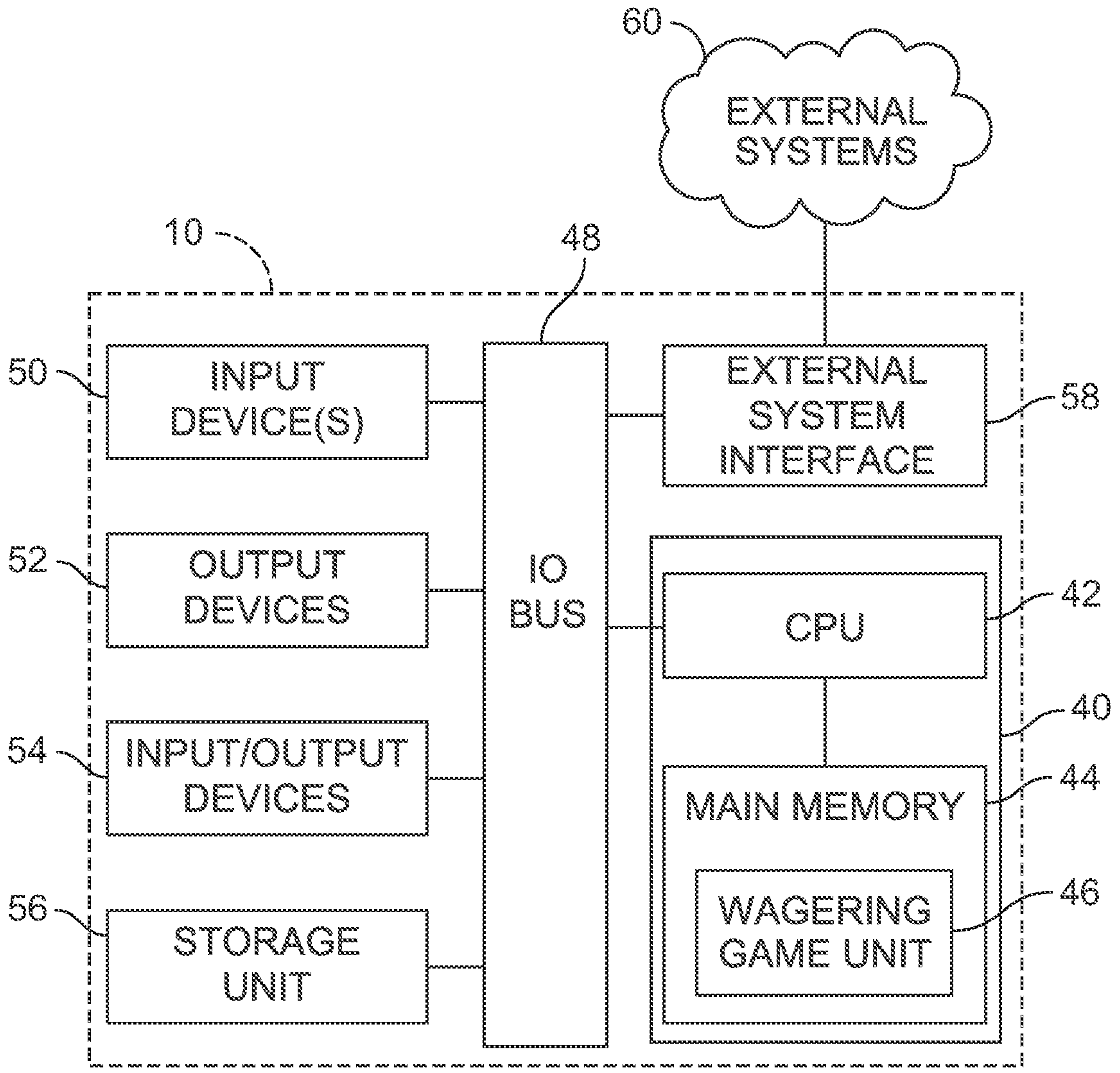
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD.

By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
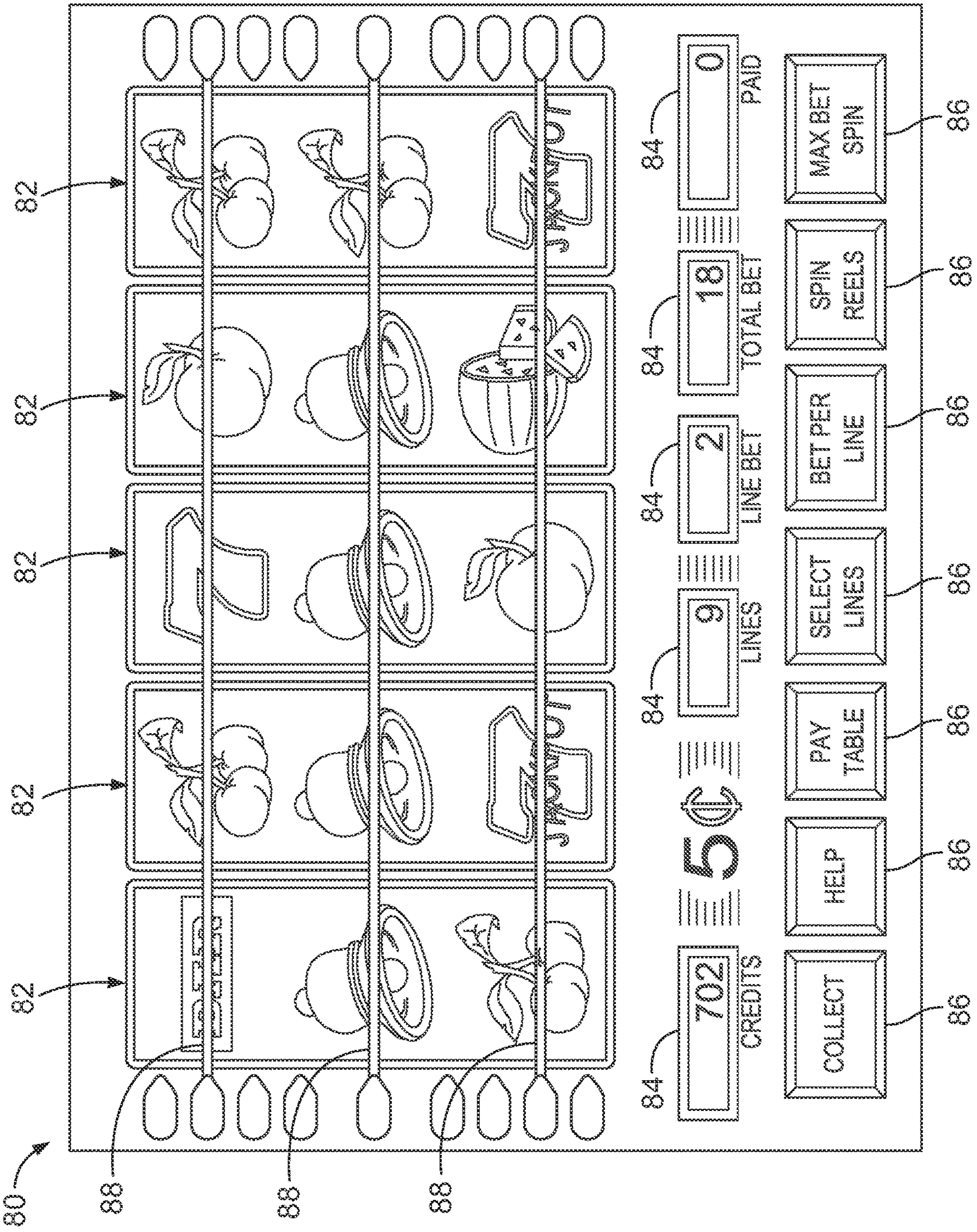
FIG. 3 is an image of an exemplary basic-game screen of a wagering game displayed on a gaming machine, according to embodiments of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager drawn on or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus games in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
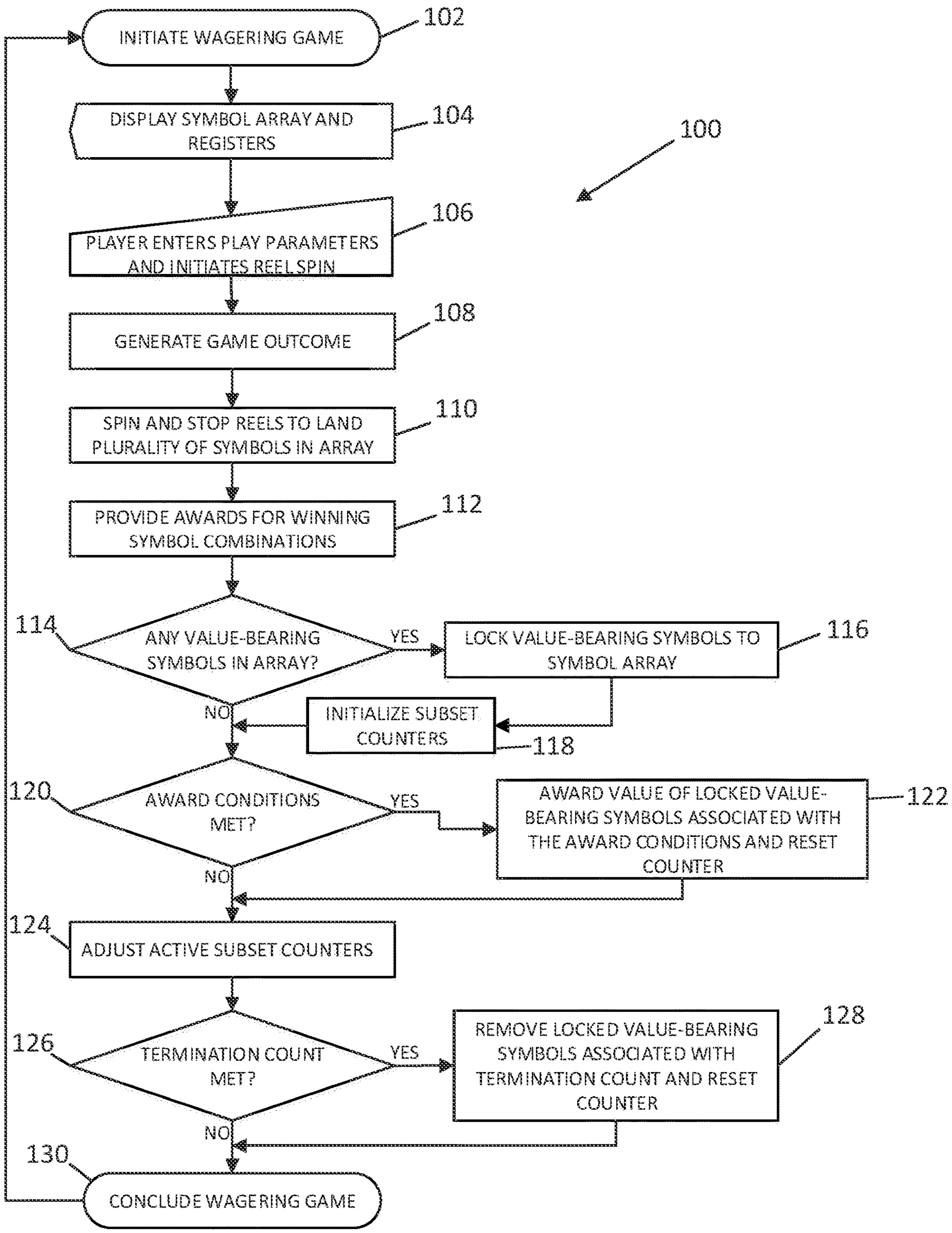
FIG. 4 is a flowchart for an algorithm that corresponds to instructions executed by game-logic circuitry in accord with one or more of the present concepts.

Referring now to FIG. 4, there is shown a flowchart representing a data processing method 100 corresponding to at least some instructions stored and executed by the game-logic circuitry 40 in FIG. 2 to perform operations according to one or more embodiments of the present concepts. The method 100 incorporates the use of value-bearing symbols presented by one or more display devices in communication with the game-logic circuitry 40. Value-bearing symbols are symbols that include award indicia that visibly indicate an award value associated with the value-bearing symbol. The awards associated with the value-bearing symbols include at least the indicated award values, and awards associated with multiple value-bearing symbols may aggregated the award values of the value-bearing symbols together into an aggregated award value. The method 100 uses value-bearing symbols that are held or locked into the symbol array until either one or more award conditions are met or a counter associated with the value-bearing symbols has met a termination count or value. For example, the award condition may be to fill a column with value-bearing symbols, and if this condition is met, the values indicated by the value-bearing symbols within the column are awarded. However, if a counter (e.g., a spin or game cycle counter) associated with the column reaches a termination count prior to the award condition, then the value-bearing symbols are removed from the column. In other embodiments the method 100 includes additional, fewer, or alternative steps to be performed by the game-logic circuitry 40, the display device, and/or another suitable device of the gaming system, including those steps and devices described elsewhere herein.

At step 102, the game-logic circuitry initiates a wagering game. At step 104, the game-logic circuitry directs a display of the gaming machine to display an array of symbol in the respective symbol positions. The array of symbol positions is arranged in a number of rows (e.g., three rows) by a number of columns (e.g., five columns). The symbol positions of the array may be allocated to one or more subsets for a value-bearing symbol feature described herein. In the example embodiment, each column defines a subset. In other embodiments, the subset may any other suitable grouping of symbol positions. Each subset is associated with a subset counter that is selectively initialized and terminated as described herein. At step 106, a player enters play parameters such as a wager amount to be drawn from a credit balance (deducted from a credit meter) and number of lines or ways along which winning symbol combinations must appear. To initiate a spin of the reels, the player may press a "Spin Reels" or "Max Bet" key on a button panel or touch screen. At step 108, in response to the player initiating the reel spin, the game-logic circuitry generates a random game outcome. At step 110, the game-logic circuitry spins and stops the reels to land a plurality of symbols in the displayed array according to the selected game outcome. At step 112, the game-logic circuitry provides awards for any winning symbol combinations (e.g., line pays and scatter pays) in the array.

At step 114, the game-logic circuitry determines whether or not the landed plurality of symbols include any value-bearing symbols. If one or more value-bearing symbols are included within the landed plurality of symbols, the game-logic circuitry then locks any value-bearing symbols to the symbol array at step 116 such that the locked value-bearing symbols remain within the symbol array through one or more subsequent spins. Each value-bearing symbol may be locked to a symbol position, row, or column, such as the symbol position, row, or column in which the value-bearing symbol occupied as part of the landed plurality of symbols.

At step 118, for subsets of the symbol array that did not include locked value-bearing symbols prior to the game outcome and are now occupied by one or more locked value-bearing symbols from step 116, a respective subset counter is initialized. The respective subset counter is initialized to an initial count or value. In at least some embodiments, the initial count is predetermined. In other embodiments, the initial count may be variable according to one or more parameters (e.g., randomly generated values, wager amount, player history, etc.). In the example embodiment, the subset counters are configured to count spins or game outcomes. In other embodiments, the subset counters may be configured to count a different parameter of the game, such as a number of outcomes with or without a particular symbol.

At step 120, the game-logic circuitry determines whether or not award conditions have been met for at least some of the locked value-bearing symbols. In the example embodiment, the award conditions include locking value-bearing symbols in every symbol position of a particular subset. In other embodiments, the award conditions may not require the entire subset be filled with value-bearing symbols, but rather a trigger amount of value-bearing symbols be reached. Additionally or alternatively, other suitable conditions within the symbol array may be incorporated within the award conditions.

At step 122, if the award conditions have been met (i.e., the number of value-bearing symbols has reached the trigger amount), the values visually indicated on the locked value-bearing symbols associated with the award conditions are awarded and the associated value-bearing symbols are removed or unlocked from the symbol array. That is, the value-bearing symbols may be removed immediately to reveal an underlying symbol or a blank space in its place on the symbol array until another spin or game cycle of the game is conducted. Unlocking the value-bearing symbols may cause the value-bearing symbols to 'spin' with other symbols in the symbol array, thereby freeing the underlying symbol position for a new symbol (including a subsequent value-bearing symbol) to land within. In some embodiments, achieving the award conditions for one subset may result in every value-bearing symbol within the array being removed or unlocked. It is to be understood that the award conditions of each subset may be at least partially independent from each other such that the award conditions for multiple subsets may be met during the same game outcome. In such an outcome, awards for each winning subset may be provided simultaneously.

At step 124, the game-logic circuitry adjusts any initialized subset counters (referred to herein as "active counters" or "active subset counters") based on the game outcome. More specifically, the game-logic circuitry adjusts the active counters for at least three different states of the associated subset: (i) an award condition has been met; (ii) additional value-bearing symbols have been locked into the subset; and (iii) no new value-bearing symbols have been locked into the subset. A fourth state in which an inactive counter is initialized or activated is addressed by the step 118, and no additional changes are made to the newly activated counter by the game-logic circuitry.

In the first state in which an award condition was met, the locked value-bearing symbols have been removed or unlocked from the symbol array and a corresponding award has been provided. As a result, the game-logic circuitry deactivates the subset counter associated with the subset that included the removed or unlocked symbols. The subset counter is reverted to an inactive state until a subsequent game outcome includes a value-bearing symbol within the associated subset, thereby initializing the subset counter at step 118.

In the second state in which one or more additional value-bearing symbols have landed within a subset associated with an active subset counter, the subset counter is adjusted to, towards, or beyond the initial count. That is, the current count of the subset counter may be incremented or decremented towards the initial count, or the current count may be set to a predefined value (including being reset to the initial count). In the example embodiment, the count may be incremented or decremented by one. In certain embodiments, the count is incremented or decremented by a value other than one. This adjustment facilitates ‘streaks’ that perpetuates the feature in response to positive game outcomes that continue to approach the award conditions (i.e., accruing additional value-bearing symbols in a particular subset).

Other suitable mathematical operations may be used to adjust the counter as well. The adjustments may also be based on the current count and/or other conditions. For example, the amount by which the counter increases or decreases may be at least partially a function of the current count and/or a randomly generated value. In another example, each subset may have different adjustment configurations. In other embodiments, the subset counter may remain unchanged (i.e., the current count does not change) in the second state. It is to be understood that although the foregoing adjustments were described with respect to the second state, these adjustments may be equally applicable to other states resulting in the adjustment of the subset counters.

For the third state, in contrast to the second state, if no additional value-bearing symbols are detected in a subset, then the subset counter is adjusted away from the initial counter and towards a termination count. For example, if the initial count is three and the termination count is zero, the counter may be decremented by one for each spin or outcome in which no additional value-bearing symbols are detected in the subset.

At step 126, in response to the subset counter adjustments of step 124, the game-logic circuitry determines if any of the active subset counters have met a termination count. If the termination count has been met by a subset counter, the game-logic circuitry removes or unlocks any locked value-bearing symbols from the associated subset and deactivates the subset counter at step 128. The aggregated value of the removed value-bearing symbols is not awarded at step 128. That is, in the example embodiment, the aggregated value of the locked value-bearing symbols in a subset is only awarded in response to one or more award conditions being met for that particular subset (e.g., filling the subset with value-bearing symbols). In other embodiments, at least a portion the aggregated value may be stored (at least temporarily) in a register or other suitable game element as described in one of the foregoing embodiments to facilitate ‘redemption awards’ through additional game features.

The game-logic circuitry concludes the current game cycle at step 130 following either a determination at step 126 that no termination count has been met by any active subset counters or in response to step 128. Subsequent game cycles may proceed according to at least some of the steps of the method 100. It is to be understood that although the steps of the method 100 have be described in a particular order, other embodiments may include additional, fewer, or alternative steps and/or reorder the described steps 102-130. For example, steps 114-128 may be reordered, and these steps may occur at any point between the outcome being generated at step 108 and concluding the game cycle at step 130.

Figure 5A:
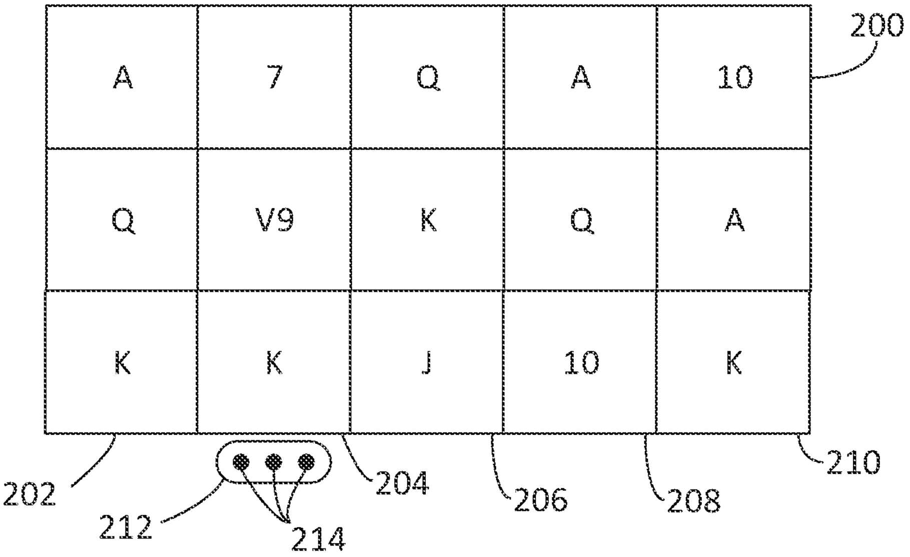
FIGS. 5A-5F are representations of a series of game cycles of a wagering game displayed on a gaming machine in accord with one or more of the present concepts.
Figure 5B:
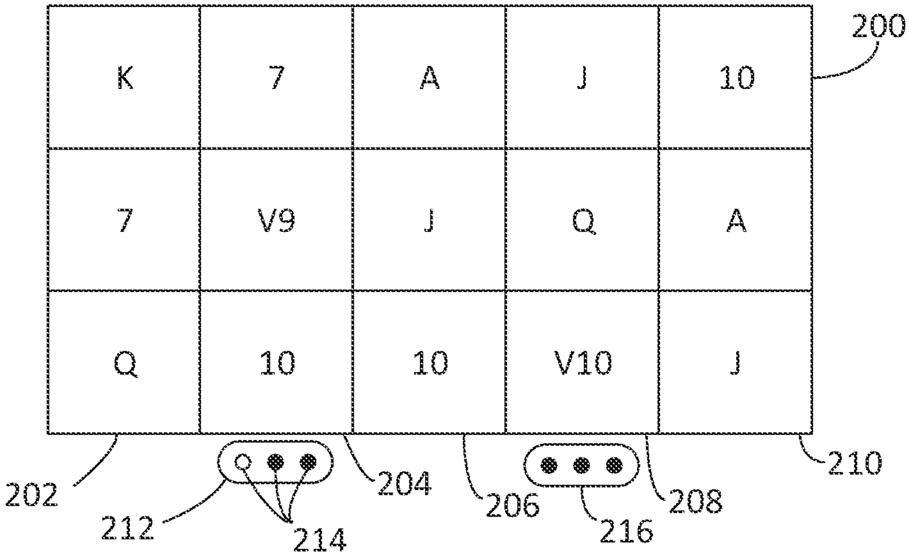
Figure 5C:
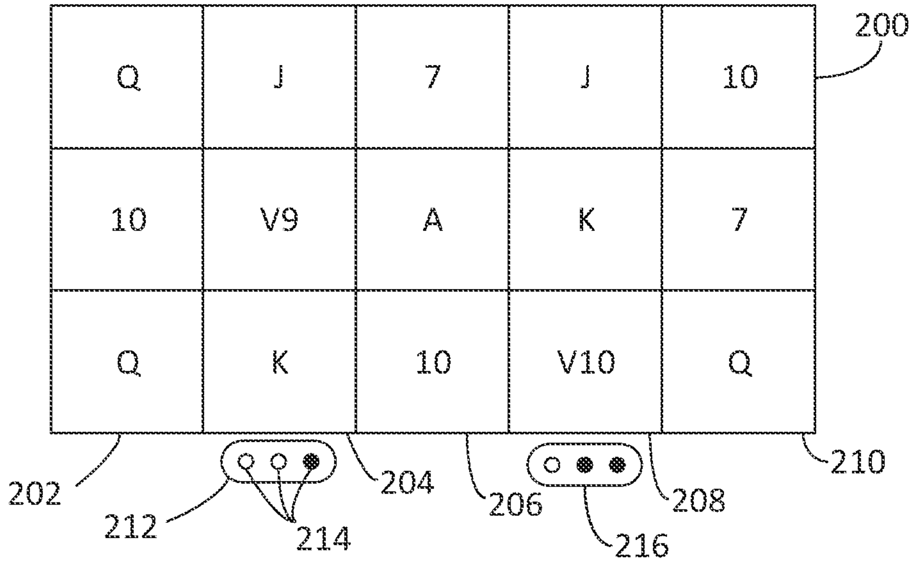
Figure 5D:
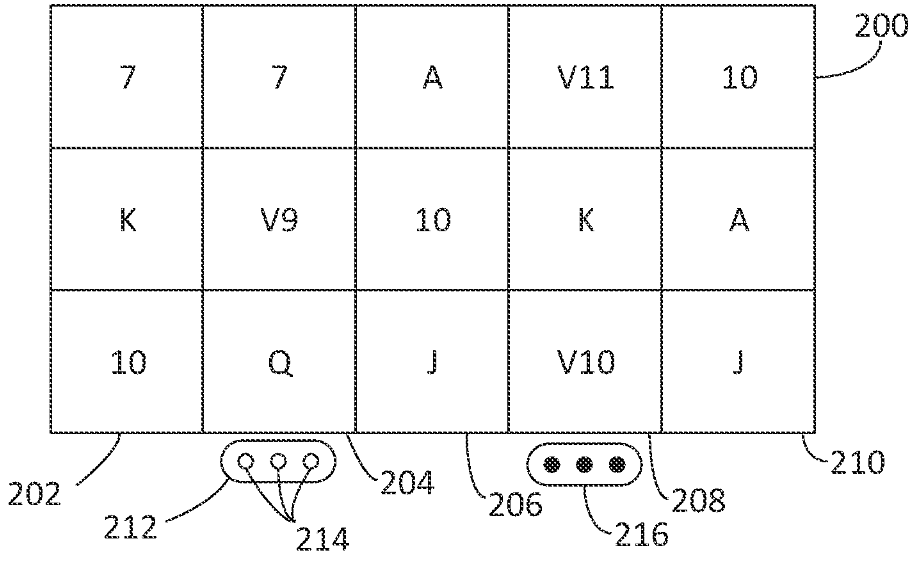
Figure 5E:
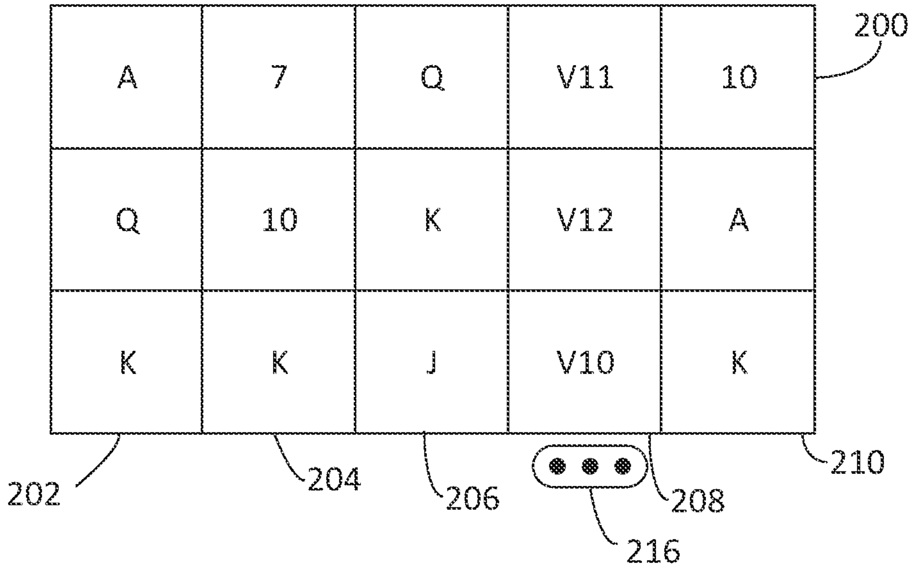
Figure 5F:
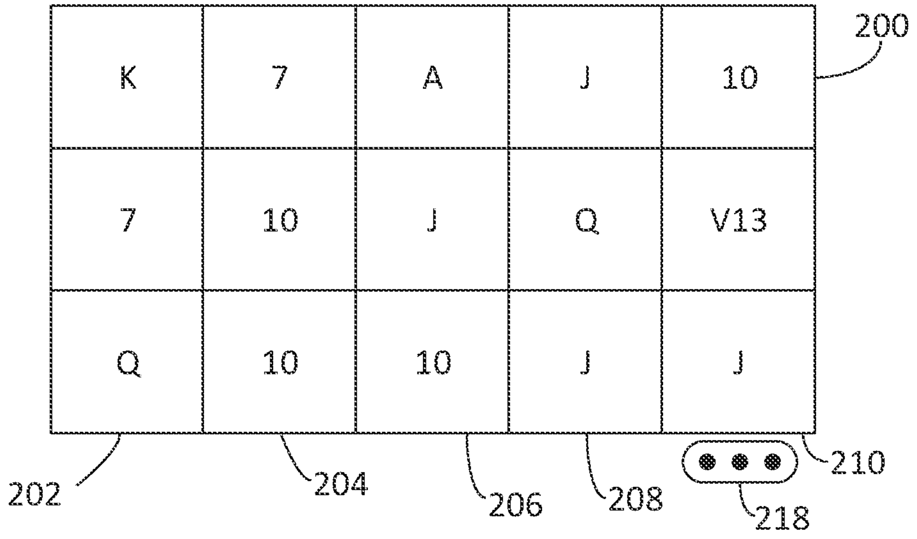

FIGS. 5A-5F depict an example game interface during play of a game implementing the game feature described in FIG. 4. More specifically, FIG. 5A depicts the interface at a first game cycle outcome, FIG. 5B depicts the interface at a second game cycle outcome, FIG. 5C depicts the interface at a third game cycle outcome, FIG. 5D depicts the interface at a fourth game cycle outcome, FIG. 5E depicts the interface at a fifth game cycle outcome, and FIG. 5F depicts the interface at a sixth game cycle outcome. The game cycles are ordered in chronological order such that the first game cycle precedes the second game cycle, which precedes the third game cycle, and so forth.

In each game cycle, a plurality of symbol-bearing reels is spun and stopped to land a plurality of symbols in a symbol array 200. The illustrated array 200 has fifteen symbol positions arranged in three rows and five columns 202, 204, 206, 208, and 210. Each column is associated with a respective reel such that each stopped reel presents three symbols. Alternatively, each symbol position may be associated with a respective independent reel such that each stopped reel presents a single symbol. The array may have more or less rows and/or columns. The number of symbol positions in each column may vary from each other. For example, the number of symbol positions in each column may be progressively increased such that the first column 202 has less symbol positions than the fifth column 210 does.

In the example embodiment, the subsets described in FIG. 4 are the columns 202, 204, 206, 208, and 210 of the symbol array 200. It is to be understood that the subsets may be defined alternatively as rows or other suitable combinations of symbol positions (including combinations that are not adjacent to each other). In certain embodiments, some of the symbol positions of the array 200 are not associated with any subset. For example, the first column 202 may not be a subset, and therefore value-bearing symbols either are not present within the reels of the first column 202 or are not locked to the first column to determine an award as described herein.

Referring to the first game cycle of FIG. 5A, the reels are spun and stopped to land a plurality of symbols in the array 200. As shown in FIG. 5A, the landed plurality of symbols includes a value-bearing symbol V9 in the second column 204. Similar to the value-bearing symbols described above, the value-bearing symbol V9 includes visual value indicia (e.g., a value presented in text) indicating a value associated with the value-bearing symbol V9. The value of the value-bearing symbol V9 and other value-bearing symbols may be predefined, fixed values or dynamic values. For dynamic values, the value of each value-bearing symbol may be randomly determined and/or a function of one or more value parameters. The value parameters may include, but are not limited to, a wager amount, wager frequency, wager history, game history, player history, and/or other suitable parameters associated with the player and/or the game. In one example, as a player wagers more on each game cycle or spin, the potential value of the value-bearing symbols may increase. In certain embodiments, the identity of the particular column or subset may be a value parameter. For example, the second column 202 may include a lower average value for each value-bearing symbol relative to the average value of value-bearing symbols within the fifth column 210. In certain embodiments, the value-bearing symbols are not limited to a value amount but may include value indicia indicating one or more progressive jackpots associated with the wagering game. That is, the value of the progressive jackpot may be awarded from a value-bearing symbol if the award conditions described herein at met.

In response to the value-bearing symbol V9 landing in the second column 204, a subset counter 212 is initialized for the second column 204. In the example interface, none of the other columns have active subset counters, and the difference between active and inactive subset counters is visually denoted by the inactive subset counters between removed from the interface. However, in other embodiments, other suitable visual characters may be used to distinguish between active and inactive counters. For example, inactive counters may be greyed-out. The subset counter 212 may undergo a transition animation to depict the change from the inactive state to active. Such a transition animation may include other elements of the interface, such as the value-bearing symbol V9 and/or the column 204.

The subset counter 212 is initialized at an initial count of three. The counter 212 is configured to count game cycle outcomes and establishes a finite window for the player to achieve the award conditions associated with the second column 204. The counter 212 includes a plurality of count indicators 214 that visually indicate the current count of the counter 212. In the example embodiment, the count indicators 214 are a series of dots in which filled-in dots represent the current count (which is three in FIG. 5A). Not only do these dots indicate the current count, but also how the current count relates to the termination count and the initial count. In other embodiments, other suitable indicators of the current count may be used, such as a text-based indicator.

The value-bearing symbol V9 is locked into the symbol array 200 such that, for one or more subsequent game cycles, the value-bearing symbol V9 occupies a symbol position irrespective of the underlying reels. That is, the locked value-bearing symbol V9 may supersede an underlying symbol from the reels in the same position, or the reels may ignore or skip the symbol position. The value-bearing symbols may be locked into the symbol positions in which the value-bearing symbols landed in or other symbol positions within the symbol array 200. For example, the value-bearing symbol V9 may be locked to the second column 204 such that the value-bearing symbol V9 may be moved to a different position within the second column 204. This may be beneficial particularly in embodiments in which paylines and/or other features of the game may need certain rows or symbol positions unoccupied by value-bearing symbols to activate. The locking process may include one or more animations to indicate to the player that the value-bearing symbol has been locked. For example, a border or background may be added to the symbol position of the locked value-bearing symbol V9 to visually distinguish the locked symbol position from other symbol positions. In another example, one or more visual characteristics (including any animation) of the value-bearing symbol V9 may be changed to indicated that the value-bearing symbol V9 has been locked.

With respect now to FIG. 5B, the second game cycle has been initiated to generate an outcome, and the symbol array 200 has been populated by a new set of symbols with the exception of the locked value-bearing symbol V9. In the second game cycle outcome, no additional value-bearing symbols have been detected in the second column 204. As a result, the subset counter 212 is decremented by one, and the count indicator 214 has been updated to indicate that the current count is two. In other embodiments, different adjustments may be made to the current count of the subset counter 212 in response to no additional value-bearing symbols being detected in the second column 204. For example, the initial count of the counter 212 may be zero or one, and the count is incremented instead of decremented. In another example, the counter 212 may be set at a value or count rather than applying arithmetic operations. The operations applied to the counter 212 may be linear (e.g., decrementing by one for each cycle without additional value-bearing symbols) or non-linear. Non-linear operations may be used, for example, in embodiments in which the count of the counter 212 is used to generate visual elements or animations like a graph for the indicator 214 or in embodiments in which the current count may have a functional relationship to one or more elements of the game, such as the value of the next value-bearing symbol.

In addition to the updated count of the column 212, the fourth column 208 includes a value-bearing symbol V10 in the second game cycle outcome. The value-bearing symbol V10 is locked to the fourth column 208, and a subset counter 216 associated with the fourth column 208 has been initialized similar to the subset counter 212 in the first game cycle outcome shown in FIG. 5A. As described herein, with respect to the value-bearing symbol feature, each column may be independent of the other columns. That is, the counter and award conditions are independent for each column. In other embodiments, value-bearing symbols, counters, and/or award conditions may be affected by the state of symbol positions of the array 200 outside of the associated column. For example, receiving an award for value-bearing symbols in one column may remove or unlock the value-bearing symbols in other columns.

FIG. 5C depicts the interface in response to an outcome being generated for the third game cycle. In the illustrated example, no additional value-bearing symbols landed in the symbol array 200. As a result, the subset counters 212, 216 have been decremented to one and two, respectively. The respective count indicators 214 have been updated to visually indicate these adjustments to the counters 212, 216 to the player.

Following the third game cycle, FIG. 5D depicts the outcome of the fourth game cycle succeeding the third game cycle. In the fourth game cycle, no additional value-bearing symbols have landed in the second column 204, thereby failing to achieve the award conditions within the period of time defined by the subset counter 212. As a result, the subset counter 212 has been decremented from one to zero. In the example embodiment, zero is the termination count for the counters. When the termination count is met by the counter 212, the value-bearing symbol feature is reset for the column 204. More specifically, the value-bearing symbol V9 is removed from the symbol array 200 and the counter 212 is also deactivated as described further in detail below with respect to FIG. 5E. It is to be understood that, in this context, 'removing' the value-bearing symbol V9 may include the removal of the value-bearing symbol prior to the next spin or game cycle or unlocking the value-bearing symbol V9 such that the symbol position is available to receive a new symbol from the next spin. The value(s) of the removed value-bearing symbols from the second column 204 are not awarded in the example embodiment. In other embodiments, other suitable game features may facilitate retrieval of at least a portion of the aggregated value of the removed value-bearing symbols.

The fourth game cycle outcome also includes a new value-bearing symbol V11 in the fourth column 208. The value-bearing symbol V11 is locked into the fourth column 208 and the subset counter 216 is reset to three (i.e., the initial count) as shown by the counter indicators 214 of the counter 216. That is, in the example embodiment, the current count of an active subset counter is reset to three in response to one or more additional value-bearing symbols irrespective of whether the current count is one, two, or three. In other embodiments, the current count is incremented or remains the same rather than reset to the initial count or another predefined value. It is to be understood that different configurations of the counters (i.e., different initial counts, termination counts, and/or operations) may result in different specific operations applied to the current count of the subset counters. The general configuration of the example counters is that landing new value-bearing symbols causes the current count to move towards or to the initial count and away from the termination count, and vice versa for not landing any new value-bearing symbols. This general configuration incorporates 'streak' gameplay in which continually accruing positive outcomes (i.e., a "hot streak") extend play of the game feature, while repeated misses (i.e., a "cold streak") causes the game feature to end. In other embodiments, other suitable configurations of the counters may be used to regulate play of the game feature.

The fifth game cycle follows immediately after the fourth game cycle, and FIG. 5E depicts the outcome of the fifth game cycle. As described with respect to FIG. 5D, the second column 204 did not achieve the award conditions of filling every symbol position in the column 204. As a result, the value-bearing symbol V9 was removed or unlocked from the symbol array 200 and the symbol position is populated with a new symbol (which may be another value-bearing symbol). The subset counter 212 shown in FIGS. 5A-5D has been returned to an inactive state similar to the counters of the first, third, and fifth columns 202, 206, 210. In the example embodiment, the subset counter 216 of the fourth column 208 is not affected by the subset counter 212 returning to the inactive state. The inactive state of the column 212 may persist at least until one or more triggering conditions (e.g., a new value-bearing symbol in the second column 204) are detected in subsequent game cycles.

In the fourth column 208, an additional value-bearing symbol V12 has landed, thereby filling every symbol position in the column 208 with a value-bearing symbol. In the example embodiment, the award conditions have been met for the fourth column 208, and an award is provided. More specifically, the values indicated by the value indicia of the value-bearing symbols V10, V11, and V12 are combined together as an aggregated award value. In some embodiments, if one or more of the value-bearing symbols includes a progressive jackpot indicia, the jackpot value may be combined with the other awarded values.

In addition to providing an aggregated award value, the value-bearing symbols V10, V11, and V12 are removed or unlocked from the fourth column 208 for the next game cycle, and the subset counter 216 is set to an inactive state. This process is similar to the steps taken in response to a counter meeting the termination count. The difference between the two processes, in the example embodiment, being whether or not the values of the value-bearing symbols are awarded.

FIG. 5F depicts the outcome of the sixth game cycle following the fifth game cycle. The fourth column 208 has been reset as described above to await a new value-bearing symbol to activate the column time 216 (shown in FIGS. 5B-5E) again. The fifth column 210 includes a new value-bearing symbol V13, and an associated subset counter 218 is activated similar to the subset counter 212 in FIG. 5A and the subset counter 216 in FIG. 5B. Although only one or two subset counters have been active at a time in FIGS. 5A-5F, it is to be understood that any other suitable number of columns (including none and all of the columns) may have an active associated column timer on a given game cycle. In certain embodiments, a limitation may be placed on the number of columns having an active column timer on a given game cycle.

In at least some of the embodiments, the value-bearing symbols may be combined with additional value-bearing modifiers or symbols external to the symbol array. For example, an award symbol or graphical element having indicia associated with an award value may activate (e.g., visually appear or change to indicate the award symbol is active) in response to one or more award symbol conditions, which may include the trigger condition for awarding the value-bearing symbols within the symbol array. The award from these award symbols may be provided with the award from the associated value-bearing symbols or in response to a termination condition, such as a number of game cycles being met. Persisting the award symbol over multiple game cycles may facilitate additional features for building player excitement for an upcoming award. In certain embodiments, the indicia of the award symbol may be hidden from the player's view for one or more game cycles and is revealed prior to providing an award for the award symbol. Other suitable variations and additions of award symbols external to the symbol array are contemplated for incorporation with the embodiments described herein.

FIGS. 6A-6D depict an example game interface of a gaming machine with a symbol array 300 similar to the array 200 shown in FIGS. 5A-5F. More specifically, FIGS. 6A-6D depict the game interface through an example game sequence including award symbols. The array 300 arranged in three rows and five columns 302, 304, 306, 308, and 310. In other embodiments, the array 300 may include a different number of rows and/or columns. In certain embodiments, the array 300 is not a parallelogram of symbol positions, but rather may be arranged in other suitable configurations, including a plurality of separate sets of the symbol positions.

Figure 6A:
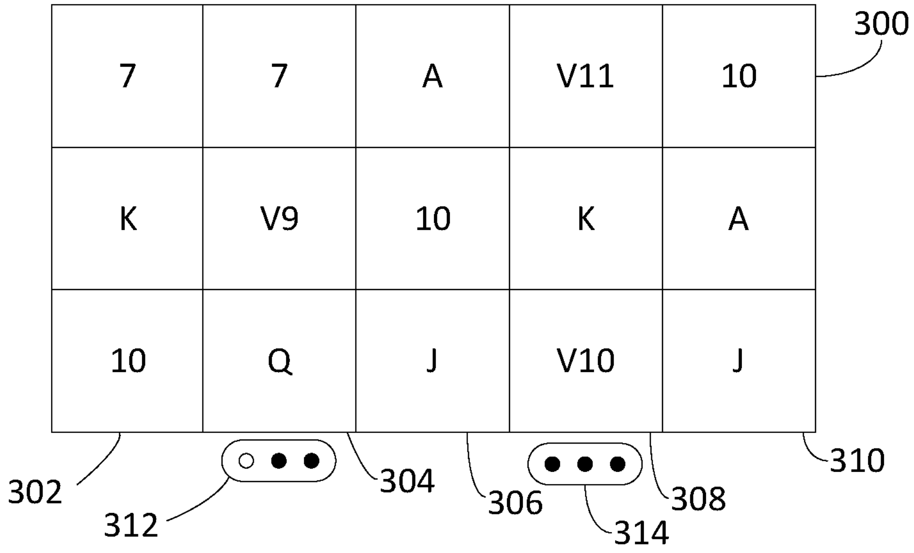
FIGS. 6A-6D are representations of a series of game cycles of a wagering game displayed on a gaming machine in accord with one or more of the present concepts.

In the example embodiment, a first state of the array 300 shown in FIG. 6A is similar to the state shown in FIG. 5D, with a pair of active subset counters 312, 314 and a plurality of value-bearing symbols V9, V10, V11. In at least some embodiments, in addition to the subset counters 312, 314, the game feature for providing awards from the value-bearing symbols may be limited in length by one or more other timers or counters. For example, the game feature described herein may be implemented as a bonus game feature that is active for a number of game cycles or rounds that may be free to the player (i.e., no wager or participation fee is required to initiate the game cycles of the bonus game feature). In another example, a periodic timer or counter may reset the array 300 after a number of game cycles or after a period of time, which may be predetermined or dynamic. These timers or counters may be used, for example, to conclude or reset the game feature and/or to provide awards for value-bearing symbols that have not met the trigger amount as described herein.

Figure 6B:
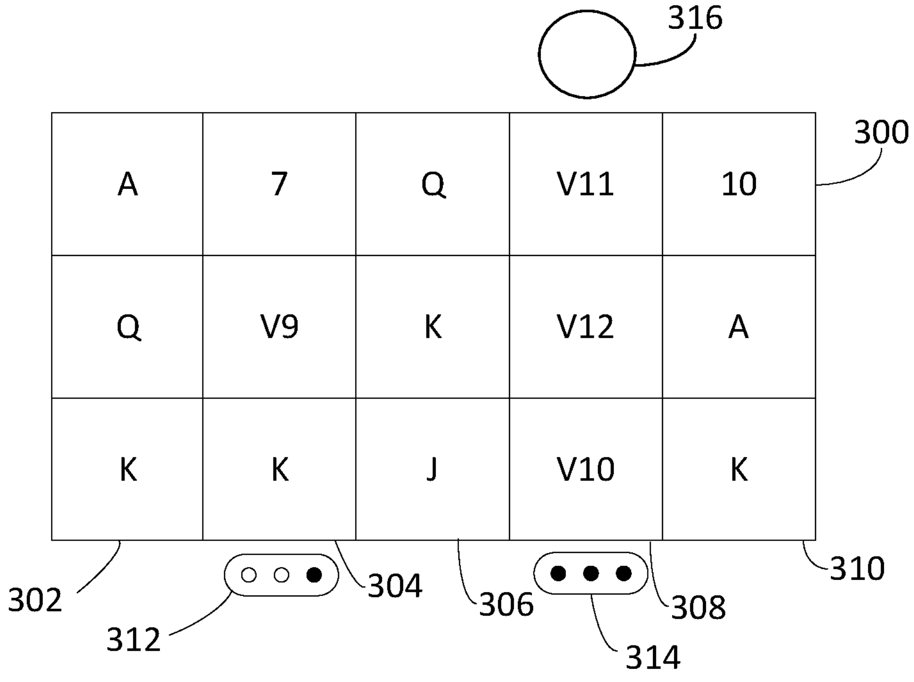

In the example embodiment, a second game state is shown in FIG. 6B. In the second game state, a game cycle after the first game state has occurred, and the fourth column 308 is populated with an additional value-bearing symbol V12. As a result, the trigger amount of value-bearing symbols for the fourth column is met, and the award values indicated by the value-bearing symbols V10, V11, and V12 are to be awarded to the player. In the example embodiment, the trigger amount may also be an activation condition for an award symbol 316. The award symbol 316 is associated with the fourth column 308 and is presented above the fourth column external to the symbol array 300. That is, other award symbols may be activated independently for each remaining subset of the array 300 (i.e., the columns 302, 304, 306, 310). Other suitable presentations of the award symbol 316 (including presentations within the array 300) are contemplated by the present disclosure.

In certain embodiments, the award symbol 316 may be associated with a plurality of subsets or the array 300 as a whole. In other embodiments, the condition or conditions for activating the award symbol 316 may include additional or alternative parameters. In one example, a different number of value-bearing symbols may trigger the award symbol 316, including a number of symbols over different subsets. The number of value-bearing symbols to generate the award symbol 316 may be referred to herein as an "award amount," which may be the same as the trigger amount or a different amount (i.e., values greater than or less than the trigger amount). In another example, the trigger condition may include achieving a threshold wager amount, wager frequency, play time, and/or other suitable values in combination with a subset or the array 300 being populated with value-bearing symbols.

In the example embodiment, rather than immediately award the player based on the value-bearing symbols V10, V11, and V12 in response to meeting the trigger amount, the value-bearing symbols V10, V11, and V12 may persist in the array 300 with the award symbol 316 for one or more subsequent game cycles. That is, the game feature described herein with respect to the award symbol 316 may be active for a limited number of game cycles, wherein expiration of the limited number of game cycles may result in an award sequence for any remaining value-bearing symbols present within the array 300, including value-bearing symbols in subsets that have not been met the trigger amount, and any award symbols. Other variations are contemplated herein, such as, and without limitation, the award sequence applying only to subsets having met the trigger amount, initiating the award sequence in response to other suitable termination conditions, and/or initiating awards sequences on a per-subset basis (i.e., award sequences for each subset may be independently initiated).

In the example embodiment, prior to the award sequence associated with the fourth column 308, the award value associated with the award symbol 316 is visibly hidden while one or more subsequent game cycles continue. Hiding the value may increase excitement and anticipation, as the player knows an additional award will be provided at prior to conclusion of the game feature. In other embodiments, the award value may be presented immediately when initially presenting the award symbol 316. In certain embodiments, rather than hiding the award value, the award symbol 316 may be animated to cycle through available award values.

Figure 6C:
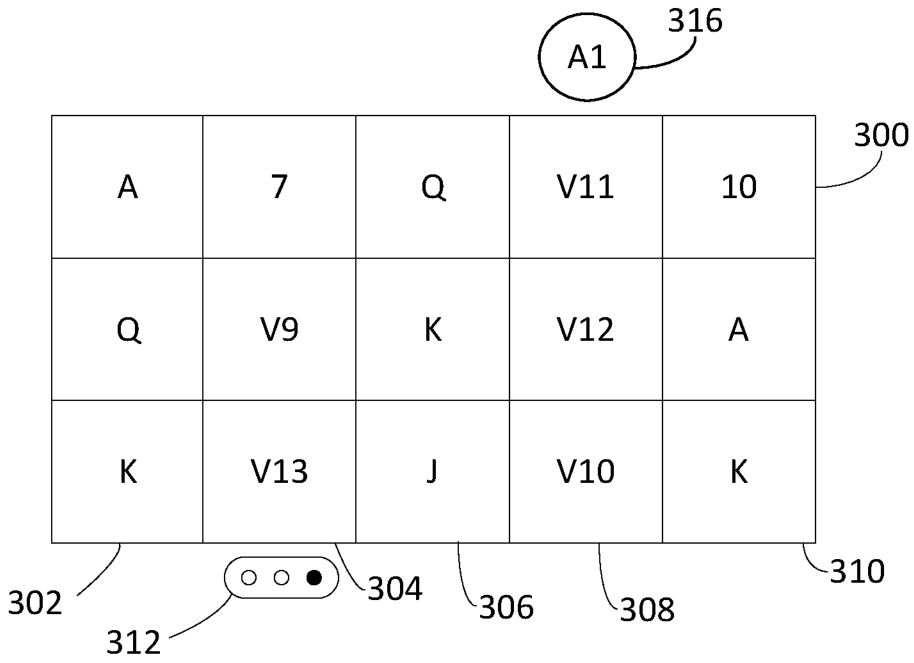

FIG. 6C depicts a third game state at which a termination condition is detected. That is, as described above, the termination condition may include a predetermined number of game cycles being determined or presented. In other embodiments, another or additional termination conditions may be detected, such as the player initiating a card out sequence to conclude the gaming session.

In the example third state, the second column 304 includes two value-bearing symbols V9, V13, and the fourth column 308 includes the award symbol 316 and the three value-bearing symbols V10, V11, and V12. At the third state, a termination condition has been met (e.g., a number of game cycles have been completed), and an award sequence is initiated. For the award sequence, an award value A1 is revealed on the award symbol 316. In the example embodiment, every value-bearing symbol present in the array 300 at the third state is awarded to the player. That is, the award values of the value-bearing symbols V9-V13 are provided in the award sequence. In other embodiments, only the value-bearing symbols V10-V12 are awarded for reaching the trigger amount.

During the bonus game feature associated with the award symbol 316, the subset counters may still be used to selectively remove value-bearing symbols from the array 300 prior to the award sequence. At the initiation of the award sequence, the subset counter may be given priority over or defer priority to the award sequence. That is, if a subset counter expires at the end of a game cycle that also initiates the award sequence, the associated value-bearing symbols may be removed prior to the award sequence (such that no award is provided for these symbols) or the award sequence may include the value-bearing symbols.

Figure 6D:
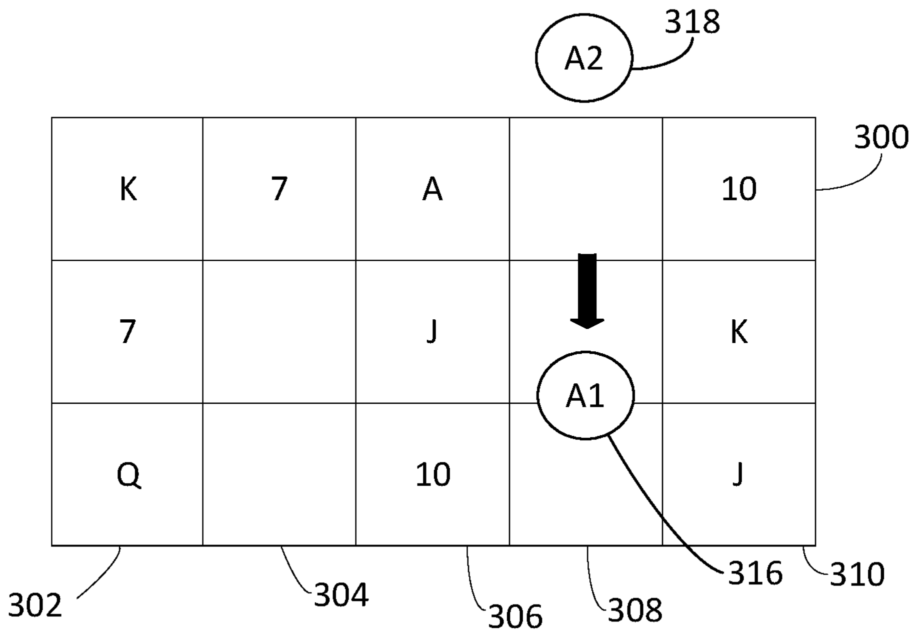

FIG. 6D depicts a fourth state following the third state during the award sequence. In the example embodiment, the value-bearing symbols may be removed from the array 300 to signify the aggregate award provided to the player. For example, each value-bearing symbol may be sequentially removed from the array 300 (e.g., left to right and top to bottom) as the associated award values are applied to a visible aggregate award value or credit balance presented by the display device of the gaming machine. In such an example, the value-bearing symbols may be animated to drop or fly off the array 300. Other suitable animations and presentation elements may be used to convey the awarded values to the player. It is to be understood the order and sequence of animations may be adjusted to fit the presentation of the award sequence. For example, the award value A1 of the award symbol 316 may be hidden until the award symbol 316 is animated to be removed from the interface during the award sequence. The award symbol 316 may be removed from the interface within, prior to, or after the sequence of removing the value-bearing symbols from the array 300.

In at least some embodiments, the award symbol 316 may not be limited to a single award value. That is, at the original position of the award symbol 316 (or another suitable position within the interface), one or more subsequent award symbols 318 may be presented during the award sequence. The subsequent award symbols 318 include award indicia visibly identifying an award value A2. In the example embodiment, the subsequent award symbol 318 is revealed as the initial award symbol 316 is animated to be removed from the gaming interface and awarded to the player. As the subsequent award symbol 318 is then animated to be removed from the interface, another subsequent award symbol 318 with an award value A3 may be presented. The subsequent award symbols 318 may be visibly identified by the player prior to presentation through additional presentation elements associated with the award symbol or alterations to the award symbol 316 (e.g., the color of the award symbol 316 changes). In one example, the subsequent award symbols 318 may appear 'stacked' to the player to indicate additional award symbols being present.

The number of award symbols 316, 318 presented during the award sequence may be randomly determined or a function of one or more parameters from play of the game. For example, the total number of value-bearing symbols within the array 300 and/or other indicia of the value-bearing symbols within the fourth column 308 may determine how many award symbols 316, 318 are provided. In certain embodiments, the determined number of award symbols 316, 318 may include at least one award symbol and up to a predefined maximum number of award symbols. In certain embodiments, the number of subsequent award symbols 318 is not determined on a per-symbol basis for each active award symbol 316, but rather is determined for a plurality of award symbols. That is, a number of subsequent award symbols 318 may be distributed between one or more active award symbols 316 during the award sequence.

The award values (A1, A2, A3, . . . An) may be the same values or different values. Similar to the number of award symbols 316, 318, the award values may be randomly determined (e.g., randomly selected from a weighted table of award values) and/or based on one or more parameters of the game. In certain embodiments, the award values may be divided between the number of award symbols from a total award value that may be at least partially randomly determined. It is to be understood that the award values and the values of the value-bearing symbols may be collectively considered an "aggregate award" provided during one or more award sequences without requiring the values being aggregated prior to being applied to the player's credit balance. That is, the awards may be provided individually or within subgroupings to adapt to the format of the award sequence or sequences of the game feature.

In at least some embodiments, after the award sequence is completed, the game may continue to a different game feature or reset the game feature associated with the award symbols. In one example, the game feature described in FIGS. 4 and 5A-5F may be performed without the award symbols after the award sequence and until a trigger condition for the award symbol game feature is detected. In another example, a base game feature using the award symbols may commence, where the award symbol 316 may be awarded immediately in response to the associated subset meeting the trigger amount, no subsequent award symbols 318 are provided, and/or incomplete subsets are not awarded after a number of game cycles. In such an example, the award symbol feature described with respect to FIGS. 6A-6D may represent a bonus or free spin game feature that is selectively triggered. In a further example, the game feature described above with respect to FIGS. 6A-6D may be reset to continue for another plurality of game cycles.

Figure 7A:
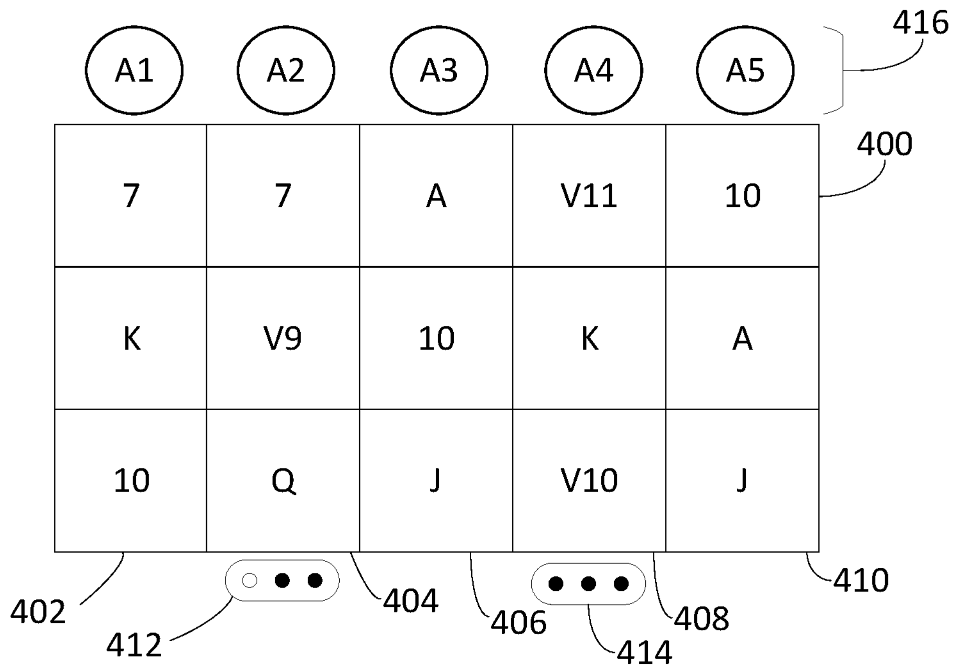
FIG. 7A is an example game interface of an exemplary game feature using award symbols in accord with one or more of the present concepts.
Figure 7B:
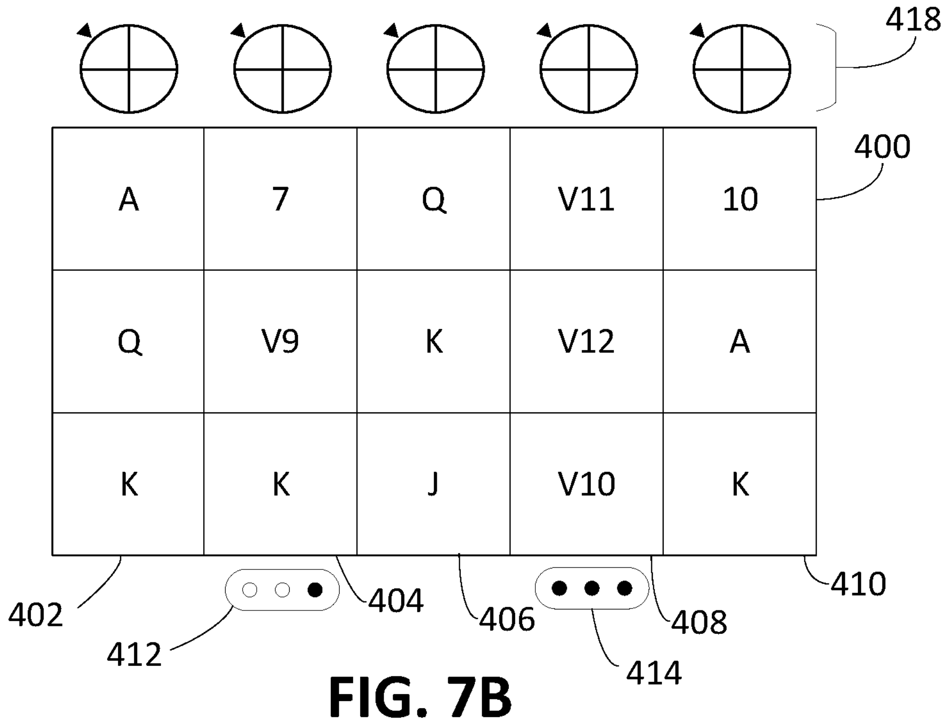
FIG. 7B is an example game interface of an exemplary game feature using wheel-based award symbols in accord with one or more of the present concepts.

FIGS. 7A and 7B depict game interfaces with other embodiments of award symbols. The features described in FIGS. 7A and 7B may be incorporated with or replace the features described in FIGS. 6A-6D. FIGS. 7A and 7B depict an example symbol array 400 having a plurality of symbol positions organized into a plurality of columns 402, 404, 406, 408, and 410 similar to the array 300 shown in FIGS. 6A-6D. In other embodiments, the game interface may include additional, fewer, or alternative elements, including those elements described elsewhere herein.

With respect to FIG. 7A, two subset counters 412, 414 are active for the second and fourth columns 404, 408. Although no award condition has been met for any of the columns in the illustrated state, a set of award symbols 416 are presented above the symbol array. More specifically, each award symbol 416 is presented above a respective column 402-410 of the array 400. In other embodiments, the award symbols 416 may be organized in a different configuration and/or associated with different subsets of symbol positions within the array 400. For example, the award symbols 416 may instead be associated with a particular row of the array 400 rather than one of the columns 402-410. In another example, each symbol position is associated with a color, background, or other visual characteristic linked to one of the award symbols 416 to define the subset. In a further example, the subsets associated with each award symbol 416 may overlap other subsets such that the functionality of the award symbols 416 described herein may be performed simultaneously with two award symbols 416. In certain embodiments, the award symbols 416 are dynamic such that the associated subset of symbol positions (which may include all symbol positions) changes within the gaming session. For example, the award symbol 416 may move within the game interface to visually indicate the association with a new subset.

In the example embodiment, each award symbol 416 presents an award value (A1-A5) through play of the game feature. The award value may change between game outcomes through one or more animations, such as flipping to a new value, spinning an underlying reel strip, or otherwise replace the old value with a new award value. In other embodiments, the award values remain fixed for a plurality of game outcomes. In one example, detecting a reset condition for the underlying subset of the array 400 causes the award value to change. In another example, awarding the award symbol 416 as described herein changes the award value. In a further example, the award value changes in response to changes to wager amount and/or frequency. The award values are selected from a range or set of available award values based at least partially on one or more random determinations by the game-logic circuitry. In other embodiments, the award values are predetermined.

In some embodiments, similar to the embodiments shown in FIGS. 6A-6D, the award values of the award symbols 416 are not presented until an award condition is triggered. That is, the award symbols 416 appear blank or otherwise obscure the award value until it is determined that the award value is to be provided to the player. The award condition and/or award sequence for the award symbols 416 may be the same or different from the award conditions and award sequence of FIGS. 6A-6D. In one example, the award condition is collecting a trigger amount of value-bearing symbols in the corresponding subset, and the award sequence reveals or otherwise presents the award value of the symbol as the award value is combined with the credit balance of the player. In another example, the game feature is a bonus game feature with a limited duration, and award sequence occurs at the end of the game feature if the corresponding award condition was achieved during the game feature. In a further example, the award condition is a random determination separate from populating the symbol array 400, where one or more award symbols 416 are selected to be awarded. In yet another example, the award sequence for the award sequence may not cause the award value of the award symbol 416 to be directly awarded, but rather modifies the award value of one or more value-bearing symbols within the array 400 and/or adds a new value-bearing symbol to the array 400, where the award value of the new value-bearing symbol is at least partially a function of the award value of the award symbol 416. In another example, one or more award conditions (e.g., a combination of certain symbols within the array 400) cause a plurality of award symbols to be awarded together.

The award symbols 416 may be configured to provide a single award value or a plurality of award values in response to an associated award condition. That is, the award symbols 416 may be configured to function similar to the award symbols 316, 318 shown in FIGS. 6C and 6D, where a plurality of awards are provided. Each award may be presented as a separate award symbol 416 or as a plurality of awards originating from the same award symbol 416. The number of awards and/or the amount of each award may be at least partially random or predetermined. In such embodiments, the number of awards can include one and up to a predetermined maximum number of awards. The value of each award may be scaled or otherwise based on the number of awards for the award symbol 416.

In certain embodiments, the award symbols 416 include active and inactive symbols. Active award symbols 416 are eligible to be awarded or have already been award but await an award sequence (e.g., at the conclusion of the game feature). Inactive award symbols 416 are not eligible to be awarded such that even if the award condition of an inactive symbol 416 is triggered, the award of the inactive symbol 416 is not provided. The active and inactive award symbols 416 may be distinguishable based on visual characteristics. For example, the inactive symbols may appear transparent, greyed out, or altogether hidden from the game interface. The determination of active or inactive for each award symbol 416 may be based on, for example, player selection, random determination, the symbols within the array 400, the wager amount and/or frequency of the player, the player account history, and/or other suitable parameters associated with the game feature.

The award symbols 416 may take any suitable form to provide the functionality described herein. Similarly, the award sequence or animation for providing the award values of the award symbols 416 may be adjusted according to the design and/or function of the game feature. For example, FIG. 7B depicts award wheels 418 in place of the award symbols 416 shown in FIG. 7A. The award wheels 418 are segmented and each wheel segment includes a corresponding award value or jackpot value. In response to an award condition associated with one of the award wheels 418, the wheel 418 and/or a corresponding selector (illustrated as an arrow pointing towards the wheel 418 in FIG. 7B) are spun and stopped to select one of the wheel segments. The award value or jackpot value associated with the selected wheel segment is then provided as an award. In other embodiments, the selection may occur for each game outcome or several game outcomes such that the selected award is provided in response to achieving the corresponding award condition. In further embodiments, rather than depicting separate wheels for each subset of the array, the game interface may include a single award wheel 418 that selects the award value for any subsets achieving the award condition for a given game outcome.

Other suitable award presentation elements similar to the symbols and wheels shown in FIGS. 6A-7B are contemplated as within the spirit and scope of the present disclosure. For example, one or more reel strips may be provided in place of the award symbols 416 in FIG. 7A, where the reel strips include award symbols 416 or award values that randomly populate award positions on the game interface. In other embodiments, the award condition triggers an award sequence with presentation elements that replace or obscure the symbol array to select one or more award values. In one example, the single award wheel 418 described above is presented over the array 400 in response to detecting an award condition, and one or more wheel segments are selected to provide the award value (or set of award values) associated with the award condition to the player.

In some embodiments, the features and functions described in the present disclosure are not limited to triggering based on value-bearing symbols. That is, other suitable trigger symbols (including symbols that are converted to value-bearing symbols as described herein) may be used in place of or in combination with the value-bearing symbols to initiate subset counter and trigger awards. For example, modifier trigger symbols may be used to modify the award value of one or more other value-bearing symbols. In another example, at least one type of trigger symbol has a hidden award value that is revealed and/or has a modifiable value that is updated in response to a modifier event as described herein. In a further example, at least one type of trigger symbol causes an award game feature to initiate (e.g., selecting a jackpot award or credit award from a segmented wheel). Accordingly, it is to be understood that the foregoing and following systems and methods may incorporate other trigger symbols where the use of value-bearing symbols is described herein. For example, the trigger symbols may be used within the method 100 (shown in FIG. 4) in addition to or in place of the value-bearing symbols.

Figure 8:
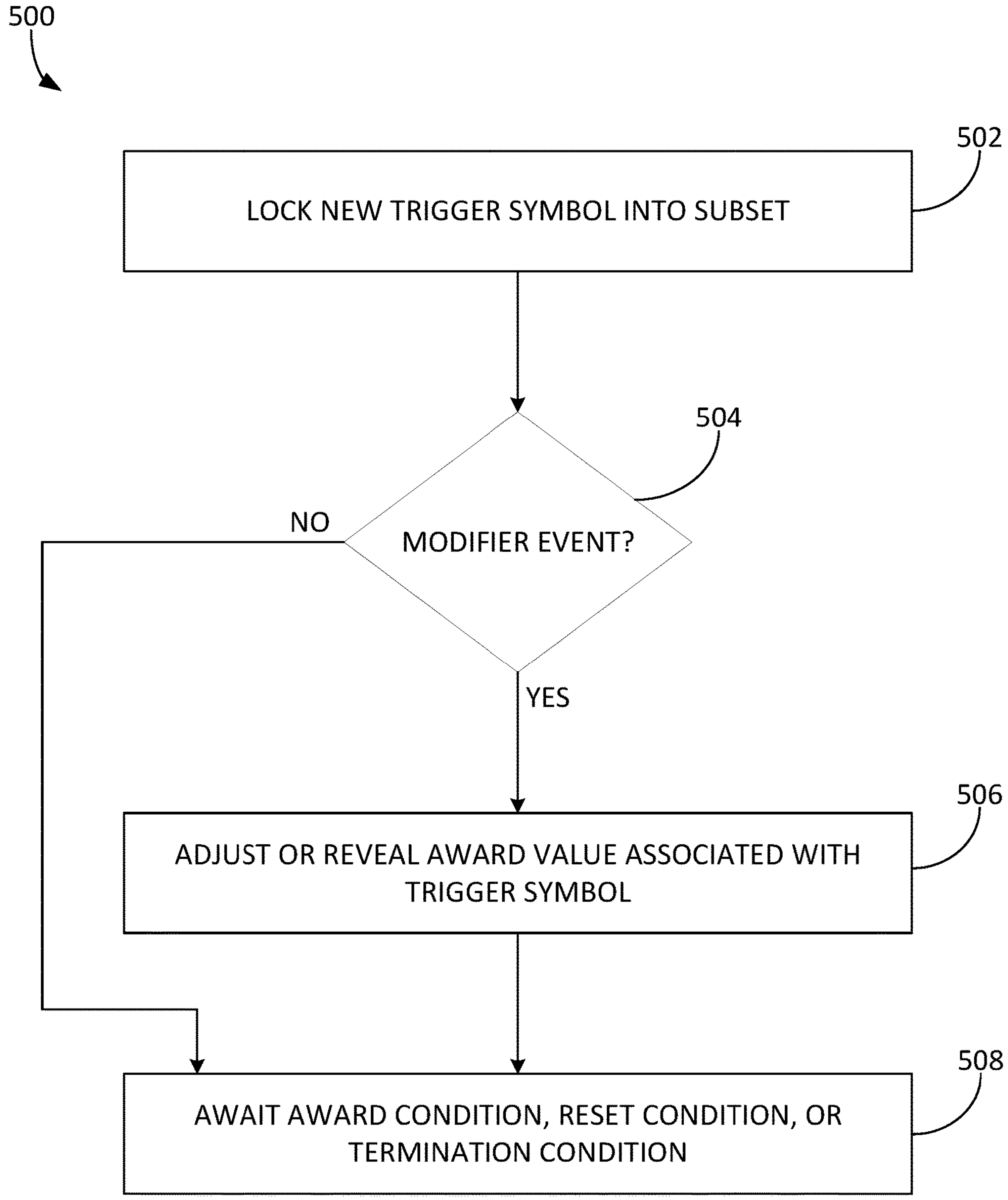
FIG. 8 is a flow chart for an algorithm that corresponds to instructions executed by game-logic circuitry in accord with one or more of the present concepts.

FIG. 8 is a flow diagram of an example method 500 for modifying, revealing, or otherwise update the award values associated with trigger symbols. That is, in response to a particular game event or conditions associated with the game feature, an award value associated with a trigger symbol is generated and/or updated. In at least some embodiments, the method 500 is integrated into a method similar to the method 100 shown in FIG. 4 and conducted by a gaming machine. More specifically, the steps of the method 500 may be integrated through steps 114-128 of the method 100. In other embodiments, the method 500 is integrated within another suitable game feature conducted by a gaming machine. The method 500 is at least partially performed by game-logic circuitry of the gaming machine in communication with one or more display devices to present the game feature associated with the method 500. In other embodiments, the method 500 is at least partially performed by another suitable device and/or includes additional, fewer, or alternative steps, including those described elsewhere herein.

As mentioned above, the method 500 is integrated within a game feature. As a result, the method 500 begins in response to one or more new trigger symbols populating the symbol array from a game or spin outcome. At step 502, the new trigger symbols are locked into the respective subsets and any associated subset counters are initiated or reset as described in the method 100. If the number of trigger symbols in the subset reaches or exceeds a trigger amount, the trigger symbols are awarded as described in the method 100.

In the example embodiment, at step 504, the game-logic circuitry determines whether or not a modifier event associated with each trigger symbol is detected. A modifier event is an event, action, or outcome of the game feature that initiates the modifications of the associated trigger symbols as described herein. The modifier events may require certain other conditions to be met in addition to the events, such as meeting play time or wager thresholds, having a predetermined number of symbols in a subset, and the like. Each modifiable trigger symbol may be associated with a one or more unique modifier events and/or modifier events shared by other modifiable trigger symbols (e.g., the other trigger symbols in the same subset).

Modifier events may include, but are not limited to: (i) the associated trigger symbol populating the array, (ii) other certain symbols populating the subset of the associated trigger symbol, (iii) other certain symbols populating the symbol array (e.g., designated trigger symbols or symbols sharing characteristics of the associated trigger symbol), (iv) certain symbols (including other trigger symbols) populating a locked symbol position with a preexisting trigger symbol, (v) symbol positions associated with the symbol position being populated by the associated trigger symbol, (vi) symbols and/or other game elements external to the symbol array that are associated with the trigger symbol activating or otherwise linking to the trigger symbol, (vii) the associated trigger symbol populating a user-selected symbol position or subset, (viii) a particular combination of symbols populating the array, (ix) player selection of the associated trigger symbol, (x) the subset of the associated trigger symbol and/or another subset reaching the trigger amount (or another predetermined amount) of trigger symbols or a particular type of trigger symbols, and/or (xi) a trigger event for a bonus game feature or other game feature. Other suitable events that are detectable by the game-logic circuitry are considered to be within the spirit and scope of the modifier events described herein.

In the example embodiment, in response to detecting a modifier event associated with a trigger symbol, the game-logic circuitry causes the display device to adjust, reveal, or otherwise present an award value associated with the trigger symbol at step 506. That is, in some embodiments, the trigger symbol is associated with an initial award value (e.g., a value-bearing symbol) that is modified or otherwise changed in response to the modifier event, and, in other embodiments, the award value is presented in an award sequence for the trigger symbol, which may include converting the trigger symbol to a value-bearing symbol, presenting another game element to provide the award, and/or other suitable presentation methods. Specific examples of the modifier events and the corresponding effects are described with respect to FIGS. 9A-12 herein.

In other embodiments, the modifier event causes the award value of one or more other symbols to be changed or revealed. For example, a modifier event associated with a first trigger symbol in a first subset may affect the award values of one or more other trigger symbols populating the first subset. In such embodiments, the trigger symbol associated with the modifier event may include an award value, multiplier, and/or other suitable operator that impacts the change to the other trigger symbols. In certain embodiments, the changes to the symbols may not impact an award value of the symbol or has an indirect impact. In one example, a trigger symbol is modified to include additional functionality, such as a trigger for a bonus game feature. In another example, where symbol combinations determine awards for a given game outcome, the trigger symbol is upgraded to a higher-value symbol type.

It is to be understood that the award value presented in response to the modifier event is a new award value generated and/or revealed responsive to the modifier and is not the same as a previously presented award value of the trigger symbol unless the modifier event results in no change in award value. For example, a trigger symbol occupying a subset may not be increased in value unless another trigger symbol is present in the subset.

The changes to the trigger symbols and/or other symbols are presented by the display device through one or more presentation elements and/or animations. That is, the presentation elements and/or the animations enable the player to readily monitor and track the changes to available and/or provided award values. In some embodiments, modified or modifiable trigger symbols may be visually distinct from other trigger symbols. For example, certain trigger symbols do not present a respective award value until the associated modifier event is detected, and other trigger symbols are presented as value-bearing symbols throughout the game feature.

At step 508, the game-logic circuitry proceeds with the game feature according to the steps of the method 100. More specifically, the game-logic circuitry generates game outcomes and causes the display device to present the game outcomes while awaiting detection of award conditions, reset conditions, and/or termination conditions. In the example embodiment, the award conditions are reaching or exceeding a trigger amount of trigger symbols in a given subset of the array, the reset condition is a subset counter reaching a reset value (e.g., zero), and the termination condition is concluding a number of game outcomes, detecting a credit balance of zero, and/or detecting player initiation of a payout sequence. In other embodiments, the game-logic circuitry monitors other suitable conditions (including additional or alternative award, reset, and/or termination conditions). In certain embodiments, the award condition and/or the reset condition may be considered modifier events. For example, one trigger symbol may have a hidden award value that is revealed and/or generated in response to the associated award condition being met. Play of the game feature continues by generating new game outcomes until another game feature is initiated or a termination condition is met.

FIGS. 9A-9D depict a game interface including an example symbol array 600 for a game feature including modifier events. The symbol array 600 and the underlying game feature may be substantially similar to the arrays and game features shown in FIGS. 5A-8. In the example embodiment, the array 600 includes five columns 602, 604, 606, 608, and 610. In other embodiments, the game interface may have a different configuration and/or the game feature may include additional, fewer, or alternative functionality, including those described elsewhere herein.

Figure 9A:
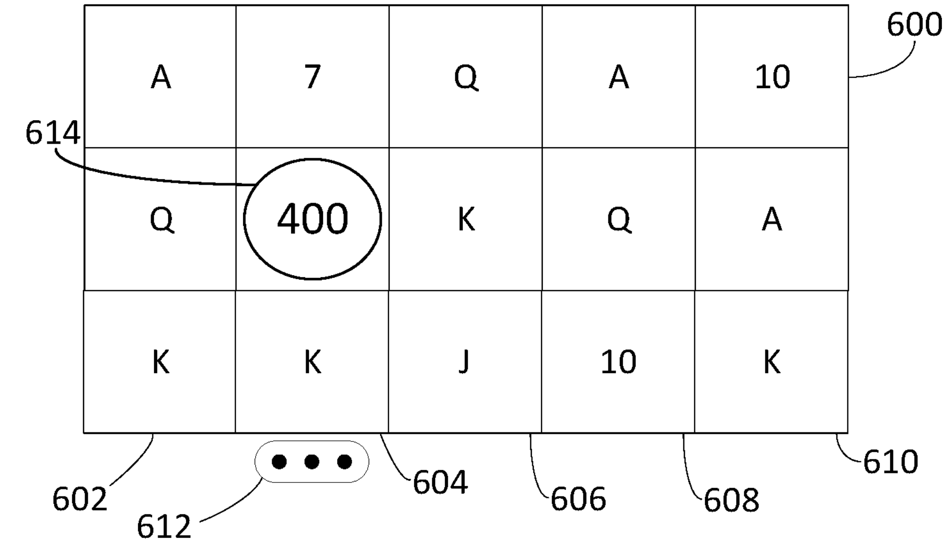
FIGS. 9A-9D are representations of a series of game outcomes of a wagering game displayed on a gaming machine using modifiable value-bearing symbols in accord with one or more of the present concepts.

FIG. 9A depicts the symbol array 600 at a first game outcome. In the first game outcome, a subset counter 612 for the second column 604 is initiated in response to a trigger symbol 614 populating the second column 604. The trigger symbol 614 in this example is a value-bearing symbol having a value of '400' and is locked into a symbol position of the second column 604 for one or more subsequent game outcomes.

Figure 9B:
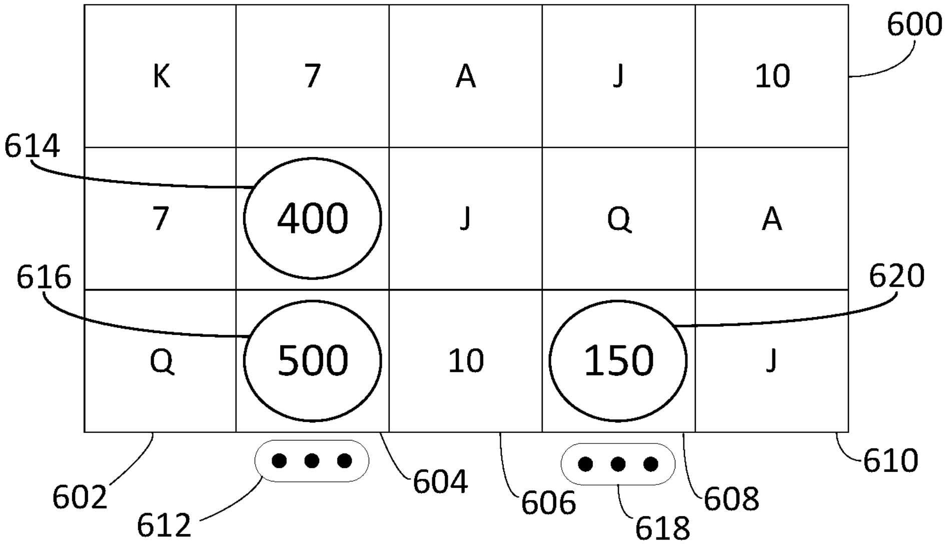

FIG. 9B depicts the symbol array 600 at a second game outcome following the first game outcome shown in FIG. 9A. In the second game outcome, another trigger symbol 616 is locked into the second column 604 (thereby resetting the subset counter to the initial value of three), and a second subset counter 618 is initiated in response to locking a third trigger symbol 620 in the fourth column 608. In the example embodiment, the values of each trigger symbol 614, 616, and 620 are different. The first and third trigger symbols 614, 620 have values selected from a range or set of available award values, while the value of the second trigger symbol 616 is determined in response to a modifier event associated with the second trigger symbol 616.

More specifically, the modifier event for the second trigger symbol 616 is the trigger symbol 616 populating a subset (i.e., column) having one or more preexisting or locked trigger symbols. In the example embodiment, the value of the second trigger symbol 616 is at least partially a function of the value of the first trigger symbol 614. That is, the second trigger symbol 616 had an initial value of '100' that is updated to include the value of the first trigger symbol. The resulting value of the second trigger symbol is '500'. The initial value of the second trigger symbol 616 may be used to ensure the second trigger symbol 616 has a corresponding award value even if no other trigger symbols are present in the subset or array. In other embodiments, the second trigger symbol 616 does not have an initial value, but rather is fully dependent on the values of the trigger symbols linked to the second trigger symbol 616 and the underlying mathematical operation(s). The "linked" trigger symbols may be all trigger symbols in the array, the trigger symbols in the same subset, trigger symbols sharing the same characteristic or type, trigger symbols occupying symbol positions sharing characteristics with the modifiable trigger symbol, and/or other suitable links between trigger symbols. In certain embodiments, the player may manually select trigger symbols to be linked together at least temporarily.

While the example provided with the first and second trigger symbols 614, 616 uses addition to generate the award value of the second trigger symbol 616, other suitable mathematical operations may be used. For example, certain types of trigger symbols or combinations of trigger symbols may result in the values being multiplied and/or an additional award bonus being added to the final award value.

In certain embodiments, the value is not based on the award values of other symbols, but rather based on the number of locked trigger symbols. In such an embodiment, the award value may increase or decrease as the number of locked trigger symbols increases. The award value may be selected from a predetermined table of award values based on the number of locked trigger symbols in the array or subset.

The award value of the second trigger symbol 616 is presented in response to the modifier event such that the initial value of the second trigger symbol 616 is presented and then updated to the final award value, thereby enabling the player to recognize the change in value of the second trigger symbol 616. In other embodiments, the initial value is not shown, and the second trigger symbol 616 is initially presented with the final award value of '500'. In further embodiments, the award value of the second trigger symbol 616 may not be revealed until an award condition associated with the second column 604 is detected.

In some embodiments, modifiable trigger symbols like the second trigger symbol 616 remain at the award value determined in response to the modifier event until the second trigger symbol 616 is removed from the array 600. In other embodiments, the modifiable trigger symbols are updated again in response to new modifier events, such as a new trigger symbol occupying the subset and/or an "update symbols" populating the subset or array, where the update symbol causes the modifiable trigger symbols to reevaluate the respective award values based on the current state of the array 600. The update symbols may be trigger symbols or other symbols that selectively populate the array 600.

In certain embodiments, the modifier event includes a new symbol (e.g., a new trigger symbol) populating a locked symbol position of the array 600. That is, while the locked trigger symbol persists in the corresponding symbol position, other symbols may selectively populate the locked position with the locked trigger symbol to activate a corresponding modifier event. The new symbols may include trigger symbols, symbols with multipliers, operators, and/or other suitable modifiers, and/or symbols that do not impact the game outcome (i.e., inactive symbols). In one example, the award value of the locked trigger symbol is modified at least partially as a function of the value, multiplier, operator, and/or other suitable modifier associated with the new symbol occupying the locked symbol position. The effect of overlapping symbols is not limited to the locked trigger symbol in at least some embodiments. For example, if a new trigger symbol populates a locked symbol position, the award value of the new trigger symbol may be applied to all locked trigger symbols in the corresponding subset.

In such embodiments with overlapping symbols, the locked symbols and/or the new symbols may be presented by the display device in a manner that enables the player to identify both symbols and/or the result of the overlapping symbols. For example, the display device may present one or more animations depicting the combination of values from the locked trigger symbol and the new overlapping symbol. In certain embodiments in which inactive symbols are included, the locked trigger symbols may fully or substantially obscure the inactive symbol. The inactive nature of such symbols may be temporary. That is, in unlocked symbol positions, these symbols may return to an active state and are incorporated within the game outcome and any winning outcome determination. This configuration may be used, for example, for embodiments including reel strips that span a plurality of symbol positions (e.g., a whole column), where the locked trigger symbol obscures one of the symbol positions associated with a given reel strip.

Figure 9C:
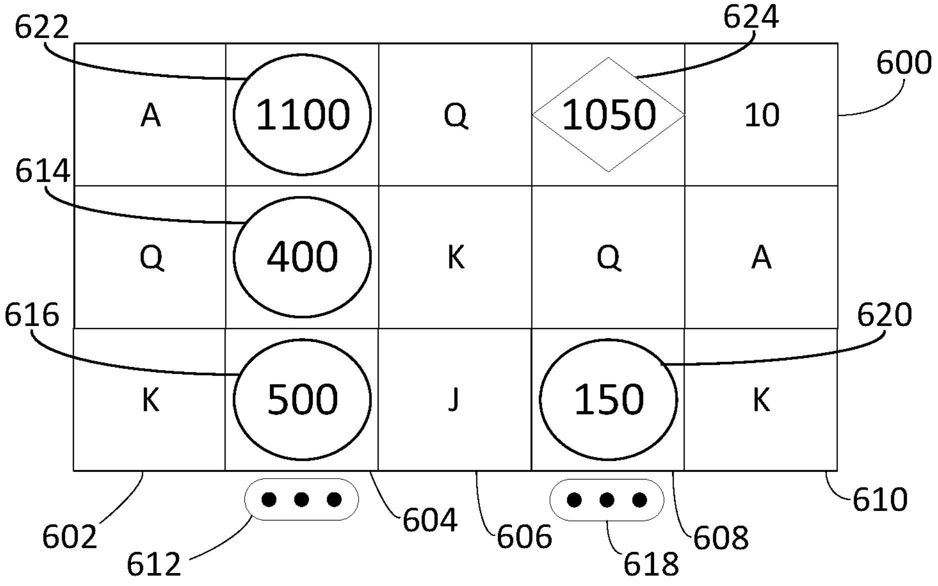

FIG. 9C depicts the game interface at a third game outcome following the second game outcome shown in FIG. 9B. At the third game outcome, a fourth trigger symbol 622 occupies the second column 604, and an enhanced trigger symbol 624 occupies the fourth column 608. In the example embodiment, the fourth trigger symbol 622 had an initial value of '200'. Like the third trigger symbol 616, the modifier event for the fourth trigger symbol 622 is populating the array 600 with the fourth trigger symbol 622, and the resulting action increases the award value of the fourth trigger symbol via aggregation. More specifically, the initial value of the fourth trigger symbol 622 is combined with the award values of the other two trigger symbols 614, 616 in the same subset to generate an aggregated award value of '1100' as presented by the display device. The aggregation may be presented through one or more animations and/or presentation elements provided by the display device.

The enhanced trigger symbol 624 have additional or alternative modifier events and/or resulting actions in comparison to other trigger symbols 614, 616, 620, and 624. In the illustrated example, the enhanced trigger symbol 624 has no initial award value, but instead aggregates the values of all other trigger symbols locked into the array 600 irrespective of the subset or other affiliation between symbols or symbol positions. That is, the enhanced trigger symbol 624 has an aggregated award value from the award values of the trigger symbols 614, 616, and 620. In certain embodiments, multiple new trigger symbols landing on the same outcome may be processed sequentially (i.e., modifying and/or locking the new trigger symbols in order) such that the award value of fourth trigger symbol 622 is also aggregated within the value of the enhanced trigger symbol 624. In other embodiments, the enhanced trigger symbol 624 has a different effect and/or different modifier event. Multiple types of enhanced trigger symbols 624 may be included in the game feature. In certain embodiments, the enhanced trigger symbol 624 may trigger the award condition without requiring the number of trigger symbols to reach the predetermined trigger amount.

In at least some embodiments, the enhanced trigger symbol 624 is visually distinct from the other trigger symbols. Although the illustrated embodiment depicts the enhanced trigger symbol 624 as a diamond and the other trigger symbols as circles or coins, it is to be understood that other suitable visual distinctions may be used. For example, the symbols may appear the same, but the symbol position of the enhanced trigger symbol 624 is visually distinct from the corresponding symbol positions of the other trigger symbols. In another example, the enhanced trigger symbol 624 has the same shape but a different color. In certain embodiments, the trigger symbols may be changed to or from enhanced trigger symbols in response to one or more game events, player input, random selection, and the like.

Figure 9D:
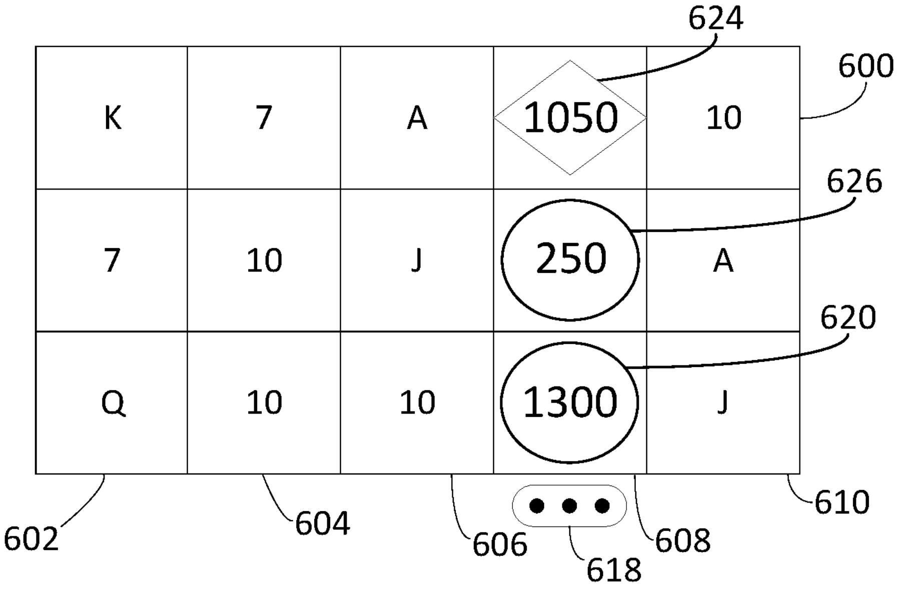

FIG. 9D depicts the game interface at a fourth game outcome following the third game outcome shown in FIG. 9C. At the fourth game outcome, the award values of the trigger symbols 614, 616, and 622 have been provided to the player through one or more award sequences. That is, filling the second column 604 with trigger symbols activated the award condition for the second column 604, and the award values of the trigger symbols 614, 616, and 622 were provided as an award to the player (i.e., the award values are applied to the credit balance of the player). The trigger symbols 614, 616, and 622 were removed from the array 600, and the subset counter 612 of the second column 604 is also removed. Any new trigger symbols in the second column 604 reactivates the subset counter 612 as described in FIG. 4.

The fourth game outcome also includes a fifth trigger symbol 626 that populates the fourth column 608. In this example, the fifth trigger symbol 626 is not modified by the other trigger symbols 620, 624, but rather includes an award value of '250' that is generated or selected by the game-logic circuitry. The fifth trigger symbol 626 and/or the corresponding symbol position may be a type of trigger symbol and/or symbol position, respectively, that do not include an associated modifier event. In other embodiments, the other trigger symbols locked in the subset or array 600 and/or the symbol position of the trigger symbol 626 prevent the modifier event from activating. That is, in such embodiments, the value or number of trigger symbols within the subset or array 600 have met or exceeded a threshold value such that subsequent trigger symbols remained unmodified. In further embodiments, activation of the modifier event associated with the fifth trigger symbol 626 is at least partially based on random determination by the game-logic circuitry. In some embodiments, the activation of modifier events is based on player selection, where the player is provided a limited number of opportunities to activate modifier events that occur within the game feature. In other embodiments, the fifth trigger symbol 626 has an active modifier event and aggregates the value of one or more other trigger symbols similar to the third and fourth trigger symbols 616, 622.

As the enhanced trigger symbol 624 is still a trigger symbol, the trigger amount of the fourth column 608 has been met. An award sequence similar to the sequence provided between the third and fourth game outcomes for the second column 604 is presented for the fourth column 608 following the fourth game outcome. In some embodiments, the enhanced trigger symbol 624 may count as a plurality of trigger symbols towards the trigger amount. In the illustrated example, such an enhancement may result in the trigger amount for the fourth column 608 being achieved at the third game outcome rather than the fourth game outcome. The award values of the trigger symbols 620 and 624 would be awarded following the third game outcome (thereby removing these symbols from the fourth column 608), and the fifth trigger symbol 626 would reinitiate the subset counter 618 for the fourth column 608.

The number of trigger symbols represented by the enhanced trigger symbol 624 may be randomly determined and/or based on one or more game events or conditions. In at least some embodiments, the modifier event associated with the enhanced trigger symbol 624 causes the enhanced trigger symbol 624 to "split" into a plurality of trigger symbols occupying a plurality of symbol positions, where the value of the split trigger symbols is at least partially based on the initial value of the enhanced trigger symbol 624. For example, the split trigger symbols may be the same value as the initial value of the enhanced trigger symbol 624 or the initial value is evenly divided between the split trigger symbols. In another example, a multiplier and/or additional award is combined with the initial award value to generate the values of the split trigger symbols. In other embodiments, the award values of the split trigger symbols are predetermined and/or generated irrespective to the value of the enhanced trigger symbol 624 (e.g., the values are generated or selected in the same manner as other trigger symbols). In one example, at least some split trigger symbols have no award value or a predetermined award value. Trigger symbols with no award value may still be beneficial to increase the chance (or guarantee, depending on the functionality of the enhanced trigger symbol 624) of achieving the award condition.

The location of the split trigger symbols within the array 600 may be the same subset as the enhanced trigger symbol 624 and/or elsewhere within the array 600. In one example, the split trigger symbols remain in the same subset to approach, meet, or exceed the trigger amount. In another example, at least some trigger symbols are split to occupy other subsets with active counters, such as a subset that is the closest to reaching the corresponding trigger amount of trigger symbols. In a further example, the split trigger symbols occupy symbol positions at least partially based on one or more random determinations.

In certain embodiments, in addition to or instead of splitting or duplicating, the enhanced trigger symbol 624 is configured to relocate and/or cause other symbols to relocate within the array 600. In one example in which the enhanced trigger symbol 624 aggregates award values from locked trigger symbols in a subset, the enhanced trigger symbol 624 may be moved from an initial position in a subset with no locked trigger symbols to a subset with at least one locked trigger symbol, thereby ensuring the function of the enhanced trigger symbol 624 is maintained. In another example, the enhanced trigger symbol 624 may "pull" a locked trigger symbol from another subset to reach or approach the trigger amount in the subset of the enhanced trigger symbol. The triggers for the movement and/or splitting associated with the enhanced trigger symbol 624 may be the modifier events as described above or separate trigger events. In certain embodiments, the trigger events are the modifier events in combination with one or more other conditions of the game, such as the number of locked trigger symbols in each subset and the like.

It is to be understood that the functions of the trigger symbols and enhanced trigger symbols described above can be combined or isolated in any suitable configuration for the game features described herein. It is also to be understood that functionality tied to a particular trigger symbol may instead be tied to a particular subset or symbol position. For example, the functionality of the enhanced trigger symbol 624 over a regular trigger symbol may be imparted by the underlying symbol position rather than a specialized trigger symbol existing within the set of available symbols for populating the array 600. These symbol positions with additional functionality may maintain the enhancements for one game outcome or a plurality of game outcomes (including the entire duration of the game). Removing and/or adding the enhancements to the symbol positions may be at least partially random, user selection, based on predetermined rules, and/or in response to one or more game events (e.g., after enhancing one trigger symbol, the enhancement is removed from a given symbol position).

Figure 10A:
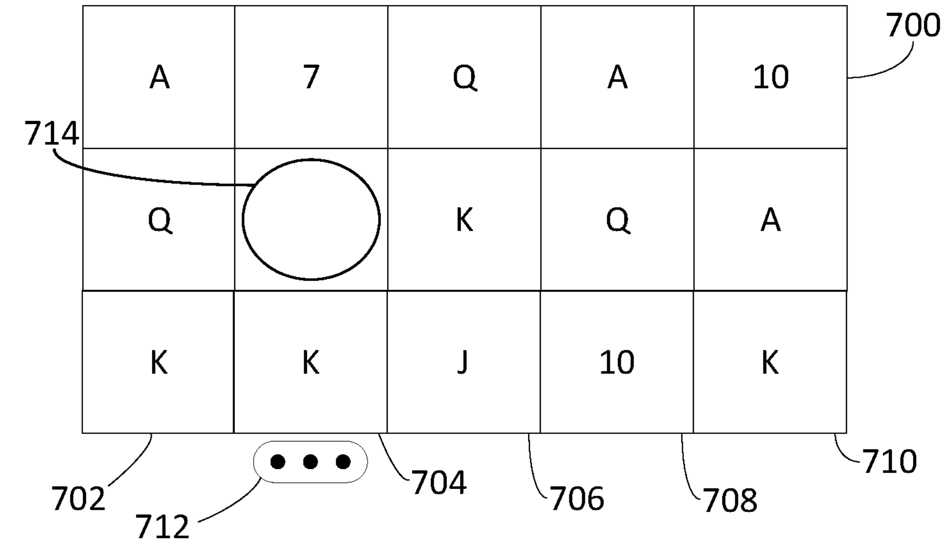
FIGS. 10A-10B are representations of a series of game outcomes of a wagering game displayed on a gaming machine using hidden value symbols in accord with one or more of the present concepts.
Figure 10B:
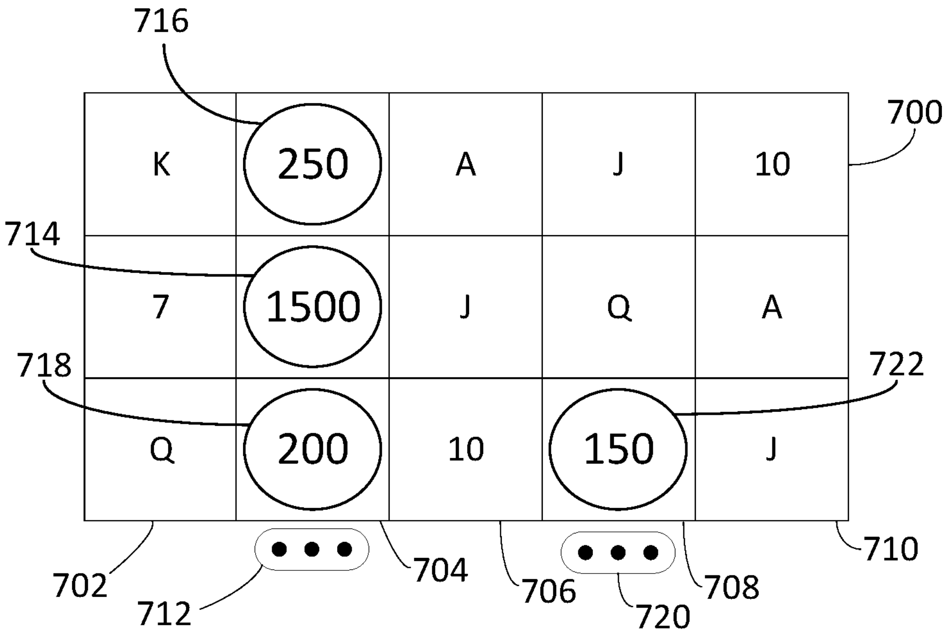

In some embodiments, one or more trigger symbols have hidden or obscured award values that are presented in response to a modifier event, such as at the time an associated award condition is detected. FIGS. 10A and 10B depict an example game interface with a symbol array 700 for a game feature similar to the features described in FIGS. 4-9D. The game interface is presented by one or more display devices of a gaming machine in communication with game-logic circuitry. The array 700 includes five columns 702, 704, 706, 708, and 710 and three rows of symbol positions. In other embodiments, the game interface includes additional, fewer, or alternative elements, including those described elsewhere herein.

FIG. 10A depicts the game interface at a first game outcome. In response to the first game outcome, the display device presents a subset counter 712 for the second column 704. More specifically, the first game outcome includes a first trigger symbol 714 in the second column 704, thereby initiating the subset counter 712 as described in FIG. 4. Unlike value-bearing trigger symbols, the first trigger symbol 714 does not include award indicia visually indicating an associated award. The first trigger symbol 714 may include no indicia, obscured indicia, a plurality of indicia, or combinations thereof (e.g., the form of the trigger symbol 714 changes in response to game events, conditions, and/or outcomes). For a plurality of indicia, the first trigger symbol 714 is not hidden, but rather the award value is not fixed and rotates through a plurality of award values (or presents the plurality of award values all at once). For example, the first trigger symbol 714 may be presented as a reel strip that spins through a plurality of available award values. In another example, the first trigger symbol 714 is a segmented wheel, where each segment represents an award value. In a further example, the first trigger symbol 714 appears the same as other value-bearing symbols (i.e., award indicia for a single award value), but cycles through a plurality of award values throughout the game feature. Other suitable presentations of the trigger symbols with hidden, obscured, and/or indeterminant award values are considered within the scope and spirit of the present disclosure.

In the example embodiment, the award value of the first trigger symbol 714 remains hidden until a corresponding modifier event is detected. The modifier event is detection of an award condition associated with the first trigger symbol 714 (i.e., meeting the trigger amount of trigger symbols in the second column 704). In other embodiments, other suitable modifier events may be used in addition to or in place of the award condition, such as detection of a new trigger symbol in the subset.

FIG. 10B depicts the game interface at a second game outcome that is subsequent to the first game outcome. In the second game outcome, the second column 704 includes two additional trigger symbols 716, 718, and the fourth column 708 includes another trigger symbol 722 to initiate an associated subset counter 720. In the example embodiment, filling the second column 704 with the trigger symbols 714, 716, 718 activates a corresponding award condition. The game-logic circuitry detects the award condition and triggers the modifier event for the first trigger symbol 714, thereby causing the display device to present award indicia for the first trigger symbol 714.

In some embodiments, the revealed award value is determined or generated in response to the modifier event. That is, no value is assigned to the first trigger symbol 714 until the first trigger symbol 714 is to be awarded to the player. In other embodiments, the award value is determined prior to the modifier event, such as during the selection of the first trigger symbol 714 from a set of available symbols for populating the array 700. The revealed award value may be generated using the same rules, range, and/or set of values as the values of other symbols, or the value may be selected or generated through separate means. For example, the set of values or range of values for hidden award values may be at least partially different from the set or range associated with other trigger symbols. In another example in which award values are selected from a weighted table of award values, the hidden award values may be selected from a different table and/or having different weighting parameters on the available award values. In the illustrated example, the award value of the first trigger symbol 714 is selected from a set of award values including and/or favoring higher values in comparison to the set of award values for other trigger symbols.

In other embodiments, the award value is at least partially based on the award values, multipliers, and other game elements within the game interface. For example, the first trigger symbol 714 may include functionality similar to the trigger symbols of FIGS. 9A-9D such that the award value of the first trigger symbol 714 includes at least the aggregate value of the other trigger symbols in the same subset. In another example, the first trigger symbol 714 reveals an operator, initial value, and/or multiplier that is combined with one or more award values on the game interface to generate the revealed award value of the first trigger symbol 714. Other functions and/or configurations of trigger symbols with hidden award values are considered within the spirit and scope of the present disclosure, including functions and configurations described elsewhere herein. In one example, the modifier event may also cause the first trigger symbol 714 to move and/or generate additional trigger symbols to populate the array 700 as described above.

The presentation of the first trigger symbol 714 may include any suitable presentation configuration to convey to the player that revealed award value. That is, one or more animations and/or presentation elements (e.g., the symbol 714 itself) are presented in a manner that enables the player to readily identify the change to the first trigger symbol 714. For example, if the first trigger symbol 714 is a wheel, reel strip, or other elements animated to cycle through a plurality of award values, the display device presents the first trigger symbol 714 "stopping" or otherwise focusing on the award value of the first trigger symbol 714. In certain embodiments, the revealed award value is presented through an additional game feature or game element, such as an award or jackpot wheel.

Figure 11A:
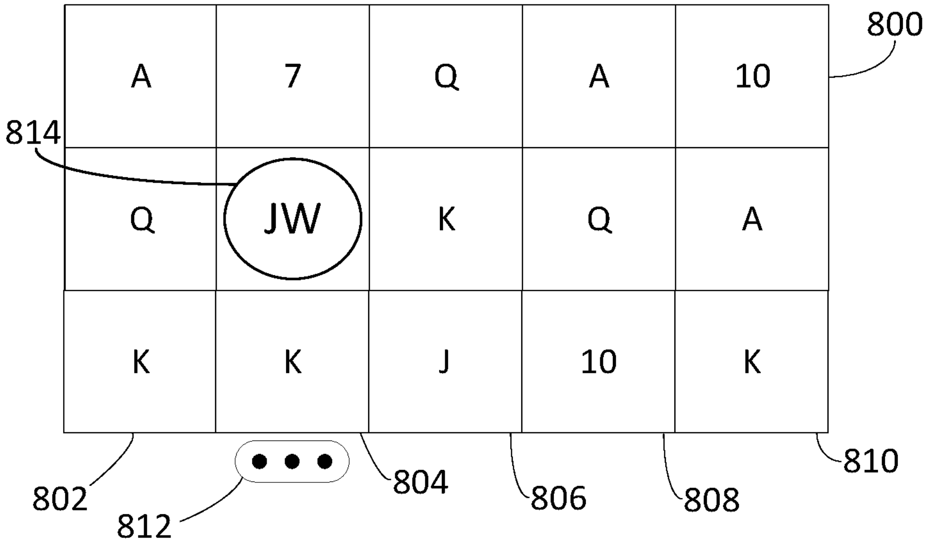
FIGS. 11A-11B are representations of a series of game outcomes of a wagering game displayed on a gaming machine using wheel-based features in accord with one or more of the present concepts.
Figure 11B:
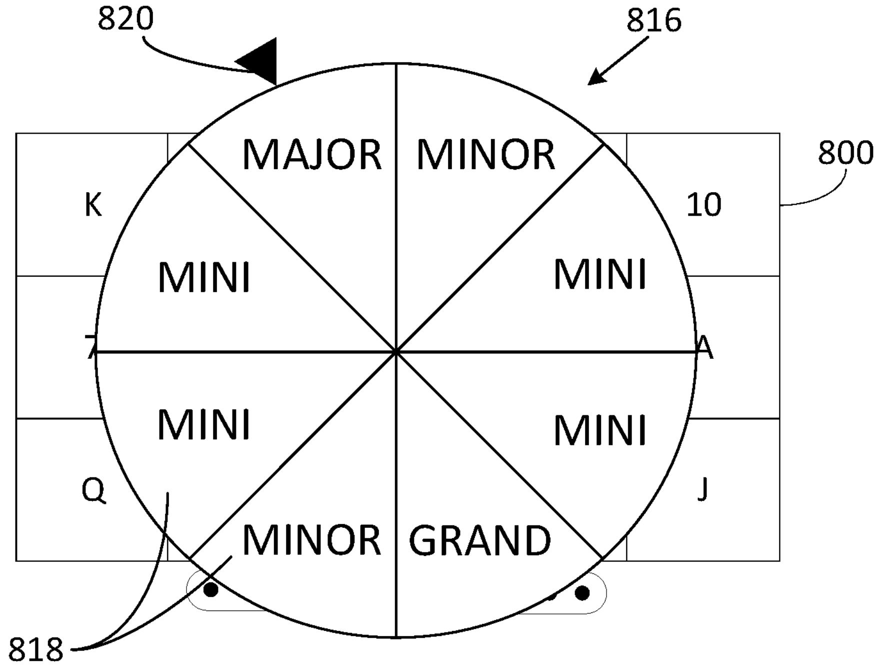

FIGS. 11A and 11B depict an example game interface similar to the interface shown in FIGS. 10A and 10B. The game interface includes an array 800 with five columns 802, 804, 806, 808, and 810. The game interface is presented by one or more display devices of a gaming machine that are in communication with game-logic circuitry. In other embodiments, the game interface includes additional, fewer, or alternative presentation and/or game elements, including those described elsewhere herein.

FIG. 11A depicts the game interface a first game outcome similar to the first game outcome shown in FIG. 10A. More specifically, the second column 804 is populated by a first trigger symbol 814, which causes a subset counter 812 to be initiated for the second column 804. Like the first trigger symbol 614 shown in FIG. 10A, the first trigger symbol 814 does not initially include award indicia for an award value. Rather, the first trigger symbol 814 includes indicia indicating other functionality associated with the trigger symbol 814. In the illustrated example, the first trigger symbol 814 includes the indicia of 'JW' to indicate the first trigger symbol 814 is associated with a jackpot wheel feature as described herein. Other suitable game features may be used with the first trigger symbol in addition to or instead of the jackpot wheel feature. For example, and without limitation, a bingo feature game, a picking feature game, roulette feature game, slot feature game, and the like may be associated with trigger symbols as describe herein.

The association between the first trigger symbol 814 and a game feature is not limited to indicia, but rather may include other suitable visual indicators (e.g., background, symbol type, etc.) to indicate the association. In some embodiments, the symbol position rather than the trigger symbol 814 is associated with the jackpot wheel feature such that the trigger conditions for the jackpot wheel feature include the associated symbol position or positions being occupied by trigger symbols. In certain embodiments, the first trigger symbol 814 includes award indicia to function the same as other value-bearing trigger symbols while maintaining the trigger functionality for the jackpot wheel feature.

In the example embodiment, the modifier event associated with the first trigger symbol 814 triggers the jackpot wheel feature. That is, reaching or exceeding the trigger amount of trigger symbols in the subset of the first trigger symbol 814 (i.e., the second column 804) causes the jackpot wheel feature to be initiated. In some embodiments, the award values for other trigger symbols in the subset are provided prior to the jackpot wheel presentation. In other embodiments, the award values are provided during and/or following the jackpot wheel presentation. In certain embodiments, the award values of the other trigger symbols are incorporated into the jackpot wheel feature (or other triggered game feature). For example, the jackpot wheel feature may include the award values of other trigger symbols and/or modify the award values of the other trigger symbols. In other embodiments, the trigger event for the jackpot wheel feature may be at least partially different from the modifier event. For example, the trigger event may include detecting a plurality of modifier events associated with symbols similar to the first trigger symbol 814 over one or more spins.

FIG. 11B depicts the game interface following a second game outcome subsequent to the first game outcome. In the second game outcome, the modifier event associated with the first trigger symbol 814 is detected. That is, the second column 804 is filled with trigger symbols. This modifier event in turn activates the jackpot wheel feature to generate or reveal an award value associated with the first trigger symbol 814.

In the example embodiment, a jackpot wheel 816 is presented over the array 800. The jackpot wheel 816 includes a plurality of wheel segments 818 associated with respective awards and segment selector 820 that visually indicates a selected segment from the wheel 816 as described herein. In other embodiments, the jackpot wheel 816 and/or the game interface have a different suitable configuration for the functions described herein. In one example, the jackpot wheel 816 is not presented over the array 800, but rather is presented elsewhere on the game interface such that the array 800 remains in view (thereby enabling the underlying game feature and/or the award sequence to continue). In another example, the segment selector 820 is presented within the boundary of the wheel 816.

In the illustrated embodiment, the jackpot wheel 816 includes a plurality of jackpot awards, where the indicia shown ("GRAND," "MAJOR," "MINOR," and "MINI") represent different jackpots. The jackpot awards may be progressive awards that are incrementally funded through wagers and/or other fund inputs or fixed, predetermined jackpots. In other embodiments, the jackpot wheel 816 includes a different number of jackpot awards and/or other jackpot award configurations. In some embodiments, the jackpot wheel 816 includes credit awards in addition to or in place of the jackpot awards. In such embodiments, the credit awards may be predetermined or based on the state of the array 800. Other suitable awards, such as modifiers to be applied to other awards (e.g., the award values of the other trigger symbols to be awarded) may be included within the jackpot wheel 816. Although the segments 818 shown in FIG. 11B are all substantially the same size, other embodiments include segments 818 of different sizes. The difference in size between segments 818 may be directly tied to the probabilities of selecting each segment such that the player can visualize the odds of selecting a particular segment 818. In other embodiments, the visual sizes of the segments 818 are not directly related to the underlying probabilities.

The display device is configured to animate the jackpot wheel 816 and/or the segment selector 820 through one or more spinning animations and then stopping on a wheel segment 818 randomly selected by the game-logic circuitry. The award associated with the selected wheel segment 818 (and, by extension, the trigger symbol 814) is provided to the player through an award sequence presented by the display device. The award sequence may be dedicated to the jackpot wheel 816, or the award sequence may be shared with other awards provided through the game feature (e.g., the awards of any value-bearing trigger symbols).

In at least some embodiments with the jackpot wheel 816, a plurality of trigger symbols 814 can be locked into the array 800 such that a plurality of modifier events associated with the jackpot wheel feature are activated simultaneously. In such embodiments, the jackpot wheel 816 may persist for a plurality of spins based on the number of modifier events detected that are associated with the wheel 816. In one example, the number of spins matches the number of modifier events (which may correspond to an equal number of trigger symbols like the trigger symbol 814 being awarded). In another example, each additional modifier event scales the number of spins, where the number of spins is greater than the number of corresponding modifier events. Between spins of the jackpot wheel 816, the wheel segments 818 may change to include additional or alternative awards, remove previously selected awards, and the like. In other embodiments, a new jackpot wheel 816 is presented for each respective modifier event associated with the jackpot wheel feature. These jackpot wheels 816 may be presented simultaneously, sequentially, and/or in other suitable configurations.

Figure 12:
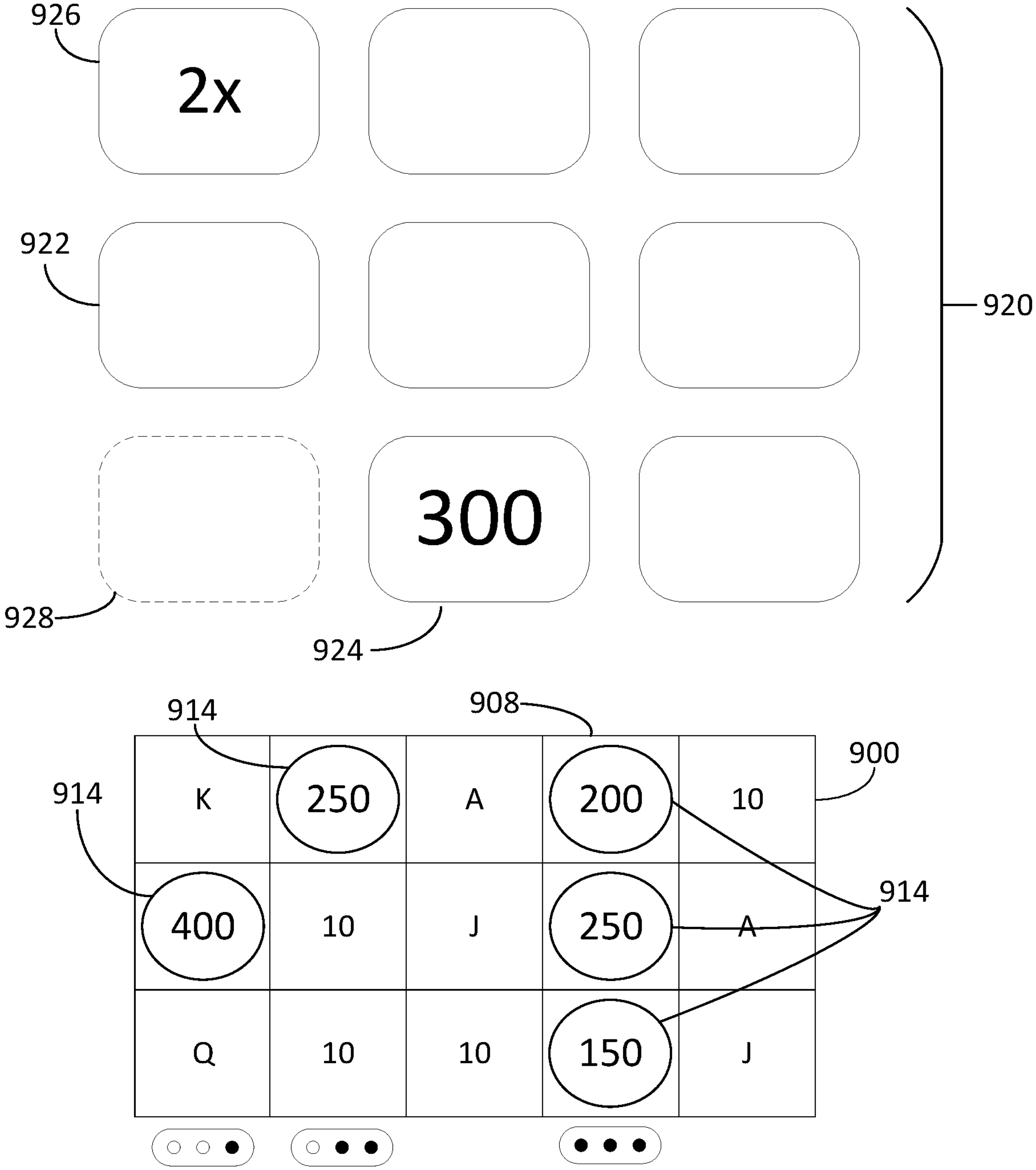
FIG. 12 is a representation of a game interface of a wagering game displayed on a gaming machine using selection-based features in accord with one or more of the present concepts.

FIG. 12 depicts a game interface of an example game feature utilizing player selection with the functionality described in the present disclosure. The game interface is presented by one or more display devices of a gaming machine that are in communication with game-logic circuitry. The game interface, similar to other game interfaces described above, includes a symbol array 900. Unless otherwise explicitly stated, the functionality and/or presentation of the game feature shown in FIG. 12 is similar to the functionality and/or presentation of the game features described above with respect to FIGS. 4-11B. In other embodiments, the game interface includes additional, fewer, or alternative elements that may alter the functionality and/or presentation of the game feature, including those elements described elsewhere herein.

In the example embodiments, the game feature includes a user or player selection function to modify or otherwise affect the awards or potential awards associated with the game feature. That is, in response to one or more modifier events, the game interface includes a plurality of player selectable options 920 and prompts the player to select one or more of the options 920. It is to be understood that although the options are shown in FIG. 12 above the array 900, the player selectable options 920 may be positioned elsewhere and/or presented in a different suitable configuration. In one example, the player selectable options are presented by a touchscreen of the gaming machine that functions as an input device of the gaming machine.

The player selectable options 920 are selectable in response to one or more modifier events. In one example, the modifier event is meeting or exceeding a trigger amount for a subset of the array 900. In the illustrated interface, a fourth column 908 of the array 900 is filled with value-bearing symbols 914, and the game-logic circuitry detects this state as a modifier event to trigger the player selection feature. In such examples, at least some of the selections by the player may apply only to the value-bearing symbols 914 within the fourth column 908. In other examples, the modifier event is detection of a particular symbol in the array 900 or detecting the conclusion of predetermined number of free spins or game outcomes. In other embodiments, the modifier event may be any suitable game state or condition that is detectable from the current aspects of the game, including aspects not shown in the illustrated embodiment. For example, the modifier event may be based on a different symbol type, a combination of symbols having different types, and/or other suitable events or conditions that one of ordinary skill in the art would recognize as based on the game feature.

The player selections described herein may apply to one, some (e.g., a particular subset), or all value-bearing symbols 914 and/or symbol positions in the array 900. The determination of which symbols and/or positions are affected by the player selection may be at least partially random, which symbols and/or symbol positions are associated with the modifier event, the type of selected option 920 (i.e., different options have different scopes of effect), and the like. In some embodiments, one or more game elements external to the player options 920 and the symbols determine the scope of the effect of the selected option 920. For example, an indicator (e.g., an arrow) external to the array 900 may identify one or more symbol positions to be affect, or one or more symbol positions are designated randomly (e.g., which may be visually indicated through a change in color, background, framing, etc.) to receive the effect of the selected option 920. In certain embodiments, the player selections may include other suitable enhancements, awards, and the like, such as awarding additional value-bearing symbols 914.

In at least some embodiments, the player selectable options are presented having a hidden, obscured, or otherwise indeterminant effect. In the example embodiment, the player selectable options are initially presented as hidden options 922. In response the player selecting a particular option, the display device is configured to reveal the corresponding modifier or effect. Several other examples states of the player options are shown in FIG. 12. The player option 924 includes a credit value of '300.' This credit value may be applied to all, some, or one value-bearing symbol 914 associated with the player selection. For example, if the player selection is associated with the value-bearing symbols 914 of the fourth column 908, the value of each symbol may be increased by '300' in response to the selection of the option 924. The credit value may be applied randomly to one or more value-bearing symbols. In another example, the award values of all new value-bearing symbols 914 populating the array 900 for at least one or more game outcomes following the selection are increased by the selected award value.

In certain embodiments, rather than applying the value to other symbols, the credit value is combined with other awards of the player. For example, the modifier event triggering the player selection may also be the award condition (e.g., for the fourth column 908) such that an award sequence is guaranteed for one or more awards. The credit award of the option 924 is then combined with the other awards of the award sequence. In further embodiments, the credit value may replace the credit value of one or more value-bearing symbols 914 and/or add additional value-bearing symbols 914 to the array 900. In one example, the selection causes all value-bearing symbols 914 with an award value below the selected value to be increased to the selected value, thereby establishing an award value floor. In another example, the selection adds a value-bearing symbol 914 with the selected value to a subset approaching the respective trigger amount of trigger symbols (e.g., the value-bearing symbols 914). Other suitable means and/or configurations of applying the credit value to value-bearing symbols 914 and/or other game elements of the game feature are considered to be within the spirit and scope of the present disclosure, including those means described elsewhere herein.

Another player selectable option 926 includes a '2×' multiplier, where one or more values are applied to multiplier to increase the resulting value. Similar to the credit value of the option 924, the multiplier option 926 is applicable to all, some, or one of the value-bearing symbols 914 and/or other suitable values within the game feature, such as the credit value of other selected options 924. In some embodiments, the multiplier may be applied to unselected options 920. The multiplier is not limited to a purely numerical multiplication. That is, other suitable mathematical operations (which may include multiplication) may be used. For example, the option 926 may instead cause a plurality of award values from value-bearing symbols 914 to be aggregated together as an additional award or to replace the initial value of a given value-bearing symbol 914.

Other suitable options and modifiers included within the player selectable options 920 are considered to be within the spirit and scope of the present disclosure, including those options and modifiers described elsewhere herein. In one example, jackpot awards associated with one or more player options. That is, selection of the jackpot option either awards a jackpot or increases progression towards a jackpot award (e.g., collecting three jackpot options provides a jackpot award or a jackpot symbol is added to the array 900 similar to FIGS. 11A-11B). In another example, the options 920 include options for increasing or decreasing a number of free spins, a number of player selections, and/or a number of player selectable options 920. In a further example, one or more options 920 may change the set or range of available award values for subsequent value-bearing symbols 914 that occupy a particular symbol position or subset. That is, the subsequent value-bearing symbol 914 may be increased in value indirectly from the selected option. In another example, one or more options 920 apply effects or modifiers to a particular symbol position, group of symbol positions (including the subsets), or to the array 900 as a whole.

Following selection of an option 920, the selected option 920 is presented and the corresponding modification or other effect is applied to the game feature. The application of the modification or effect may be visually conveyed through one or more presentation elements and/or animations. For example, changes to the award values of value-bearing symbols 914 are reflected by updating the respective award indicia. The selected option 920 is then replaced by a new hidden option 922 or is transitioned to an inactive option 928 that is not selectable by the player for subsequent selections. The inactive option 928 may appear greyed out or otherwise unavailable in some embodiments. In other embodiments, the selected option 920 is simply removed from the interface, which may cause the remaining options 920 to be reorganized within the interface. For embodiments with no persistence between player selections, all the player selectable options are removed from the interface or transitioned to inactive until a new modifier event associated with player selection is detected.

In certain embodiments, the functionality described above may not rely on player input, but rather automatically selects and applies the modifications and effects of the player selectable options 920. That is, the game-logic circuitry is configured to randomly select one or more of the player selectable options 920 to proceed through the game feature. In certain embodiments, the selection alternates between player selection and automatic selection. In some of these embodiments, the game-logic circuitry determines whether the selection is automatic or manual in response to one or more game events or conditions and/or based on one or more random determinations. For example, the game-logic circuitry may be configured to randomly select between automatic and manual selection with one or more weighting parameters impacted by the wager, game, and/or player history associated with the gaming session and/or the player.

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

As disclosed in the embodiments herein, awards may be provided for each game outcome based on at least the remaining symbols. For example, line pays and scatter pays may be awarded for each game cycle outcome based on the symbols populating the symbol array. In some embodiments, the value-bearing symbols may not be associated with awards outside of the features described herein. In other embodiments, the value-bearing symbols may be included within line pays, scatter pays, and/or other suitable awards. For example, the value-bearing symbols may be treated as a special symbol, such as a wild symbol.

While the embodiments are largely described within the context of a base game, it is equally contemplated that the disclosed embodiments can be practiced within the context of a free game bonus without a wager between free game cycles.

The embodiments of the present invention provide an innovative procedure for aggregating and adjusting values of symbols in a symbol array. Game-logic circuitry executing instructions in accordance with the embodiments present a visual display of spinning reels with clearly enumerated symbology that combine in readily understood arrangements to increase in value. An observer experiences excitement and anticipation as new symbols land in the array and aggregate values are summed and displayed. In stark contrast to conventional reel-spinning games in which symbol images are evaluated for winning combinations by paytable rules, the disclosed embodiments provide immediately recognizable values in WYSIWYG display configurations while adding variability as to how the values to be awarded to the player are selected and accumulated.

The value-aggregation and value-alteration procedure may be symbol- and game-agnostic. Themes and imagery of symbols and environment may be varied with no effect on the value-aggregation process. Or, if so desired, the criteria for value-aggregation may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated—all this adds to processing overhead. Special symbols like wilds, multipliers, and scatter symbols can modify paytable values and may require separate, additional evaluation according to customized rule sets. All these procedures can be inherently more complex than simple aggregation (i.e., addition) and alteration of number values. The embodiments disclosed herein represents a win-win: simpler, almost self-explanatory graphics combined with faster, more efficient processing. The inventive value-aggregation procedure can be implemented on the vast majority of casino gaming machines without requiring upgrades or modifications.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:
- a display device configured to present a symbol array including a plurality of symbol positions; and
- game-logic circuitry configured to:
  - cause the display device to present a first cycle outcome by populating the symbol array with a plurality of randomly selected symbols;
  - in response to the first cycle outcome including at least one trigger symbol, cause the display device to lock the at least one trigger symbol in a first position subset of the symbol array;
  - initiate a subset counter associated with the first position subset to an initial count in response to the first cycle outcome and cause the display device to present the subset counter;
  - with the at least one trigger symbol locked in the first position subset, cause the display device to present at least one subsequent cycle outcome by populating the symbol array with another plurality of randomly selected symbols for each of the at least one subsequent cycle outcome;
  - in response to the at least one subsequent cycle outcome including any additional trigger symbols in the first position subset, cause the display device to lock the additional trigger symbols in the first position subset;
  - in response to a modifier event associated with a first trigger symbol locked within the first position subset, cause the display device to present a first award value associated with the first trigger symbol, the modifier event including a number of trigger symbols within the first position subset meeting a trigger amount;

in response to the number of trigger symbols within the first position subset meeting the trigger amount, cause the display device to provide an award at least partially as a function of the first award value and respective award values associated with other trigger symbols in the first position subset; and in response to the subset counter meeting a termination count, cause the display device to remove any locked trigger symbols from the first position subset.

2. The gaming machine of claim 1, wherein the other trigger symbols in the first position subset include at least one value-bearing symbol having award indicia indicating the award value associated with each of the at least one value-bearing symbol.

3. The gaming machine of claim 1, wherein the first award value is generated at least partially as a function of one or more other award values presented by symbols populating the symbol array.

4. The gaming machine of claim 1, wherein revealing the first award value includes presenting an award wheel with a plurality of award segments and selecting a first award segment of the plurality of award segments, the first award segment indicating the first award value.

5. The gaming machine of claim 1, wherein the modifier event includes player selection of a modifier, the first award value generated at least partially as a function of the selected modifier.

6. The gaming machine of claim 1, wherein the first trigger symbol has an initial award value, and the first award value is generated at least partially as a function of the initial award value.

7. The gaming machine of claim 6, wherein the initial award value is presented prior to revealing the first award value, and wherein presentation of the first award value replaces the presentation of the initial award value.

8. The gaming machine of claim 1, wherein a plurality of trigger symbols including the first trigger symbol is associated with the modifier event, and wherein an award value is revealed for each trigger symbol of the plurality of trigger symbols in response to the modifier event.

9. A method for conducting a game using a gaming system, the gaming system comprising a gaming machine and game-logic circuitry, the gaming machine including a display device configured to present a symbol array including a plurality of symbol positions, the method comprising:

causing, by the game-logic circuitry, the display device to present a first cycle outcome by populating the symbol array with a plurality of randomly selected symbols;

in response to the first cycle outcome including at least one trigger symbol, causing, by the game-logic circuitry, the display device to lock the at least one trigger symbol in a first position subset of the symbol array;

initiating, by the game-logic circuitry, a subset counter associated with the first position subset to an initial count in response to the first cycle outcome and cause the display device to present the subset counter;

with the at least one trigger symbol locked in the first position subset, causing, by the game-logic circuitry, the display device to present at least one subsequent cycle outcome by populating the symbol array with another plurality of randomly selected symbols for each of the at least one subsequent cycle outcome;

in response to the at least one subsequent cycle outcome including any additional trigger symbols in the first position subset, causing, by the game-logic circuitry, the display device to lock the additional trigger symbols in the first position subset;

in response to a modifier event associated with a first trigger symbol locked within the first position subset, causing, by the game-logic circuitry, the display device to present a first award value associated with the first trigger symbol, the modifier event including a number of trigger symbols within the first position subset meeting a trigger amount;

in response to the number of trigger symbols within the first position subset meeting the trigger amount, causing, by the game-logic circuitry, the display device to provide an award at least partially as a function of the first award value and respective award values associated with other trigger symbols in the first position subset; and in response to the subset counter meeting a termination count, causing, by the game-logic circuitry, the display device to remove any locked trigger symbols from the first position subset.

10. The method of claim 9, wherein the other trigger symbols in the first position subset include at least one value-bearing symbol having award indicia indicating the award value associated with each of the at least one value-bearing symbol.

11. The method of claim 9, wherein the first award value is generated at least partially as a function of one or more other award values presented by symbols populating the symbol array.

12. The method of claim 9, wherein presenting the first award value includes presenting an award wheel with a plurality of award segments and selecting a first award segment of the plurality of award segments, the first award segment indicating the first award value.

13. The method of claim 9, wherein the modifier event includes player selection of a modifier, the first award value generated at least partially as a function of the selected modifier.

14. The method of claim 9, wherein the first trigger symbol has an initial award value, and the first award value is generated at least partially as a function of the initial award value.

15. The method of claim 14, wherein the initial award value is presented prior to presenting the first award value, and wherein presentation of the first award value replaces the presentation of the initial award value.

16. The method of claim 9, wherein a plurality of trigger symbols including the first trigger symbol is associated with the modifier event, and wherein an award value is revealed for each trigger symbol of the plurality of trigger symbols in response to the modifier event.

17. A gaming system comprising:

a gaming machine including a display device configured to present a symbol array including a plurality of symbol positions; and game-logic circuitry configured to:

cause the display device to present a first cycle outcome by populating the symbol array with a plurality of randomly selected symbols;

in response to the first cycle outcome including at least one trigger symbol, cause the display device to lock the at least one trigger symbol in a first position subset of the symbol array;

initiate a subset counter associated with the first position subset to an initial count in response to the first cycle outcome and cause the display device to present the subset counter;

with the at least one trigger symbol locked in the first position subset, cause the display device to present at least one subsequent cycle outcome by populating the symbol array with another plurality of randomly selected symbols for each of the at least one subsequent cycle outcome;

in response to the at least one subsequent cycle outcome including any additional trigger symbols in the first position subset, cause the display device to lock the additional trigger symbols in the first position subset;

in response to a modifier event associated with a first trigger symbol locked within the first position subset, cause the display device to present a first award value associated with the first trigger symbol, the modifier event including a number of trigger symbols within the first position subset meeting a trigger amount;

in response to the number of trigger symbols within the first position subset meeting the trigger amount, cause the display device to provide an award at least partially as a function of the first award value and respective award values associated with other trigger symbols in the first position subset; and in response to the subset counter meeting a termination count, cause the display device to remove any locked trigger symbols from the first position subset.

18. The gaming system of claim 17, wherein revealing the first award value includes presenting an award wheel with a plurality of award segments and selecting a first award segment of the plurality of award segments, the first award segment indicating the first award value.

19. The gaming system of claim 17, wherein the modifier event includes player selection of a modifier, the first award value generated at least partially as a function of the selected modifier.

20. The gaming system of claim 17, wherein revealing the first award value includes automatically selecting the first award value from a plurality of award options.

21. The gaming machine of claim 1, wherein revealing the first award value includes automatically selecting the first award value from a plurality of award options.

* * * * *